(12) United States Patent
Yuan et al.

(10) Patent No.: US 8,992,050 B1
(45) Date of Patent: Mar. 31, 2015

(54) DIRECTIONAL PROJECTION DISPLAY

(71) Applicant: Rawles LLC, Wilmington, DE (US)

(72) Inventors: Robert Allan Yuan, Belmont, CA (US); Kebin Sylvia Wu, San Francisco, CA (US); Eric Gifford Marason, San Francisco, CA (US); Juli Anna Maria Satoh, San Jose, CA (US); Isabella Talley Lewis, San Jose, CA (US)

(73) Assignee: Rawles LLC, Wilmington, DE (US)

( * ) Notice: Subject to any disclaimer, the term of this patent is extended or adjusted under 35 U.S.C. 154(b) by 237 days.

(21) Appl. No.: 13/759,452

(22) Filed: Feb. 5, 2013

(51) Int. Cl.
*F21V 9/00* (2006.01)
*G03B 21/56* (2006.01)
*G03B 21/14* (2006.01)

(52) U.S. Cl.
CPC .............. *G03B 21/567* (2013.01); *G03B 21/14* (2013.01)
USPC ........................................ 362/293; 359/618

(58) Field of Classification Search
CPC ....................................................... F21V 9/08
USPC ............................................... 362/293, 231
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,847,886 B2 | 12/2010 | Munro | |
| 8,264,528 B2 * | 9/2012 | Yamane et al. | 348/59 |
| 2004/0119896 A1 * | 6/2004 | Kean et al. | 349/25 |
| 2007/0018585 A1 * | 1/2007 | Ijzerman et al. | 315/15 |
| 2008/0285282 A1 * | 11/2008 | Karman et al. | 362/252 |
| 2011/0263326 A1 * | 10/2011 | Gagner et al. | 463/34 |
| 2012/0026157 A1 * | 2/2012 | Unkel et al. | 345/419 |
| 2012/0223885 A1 | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Evan Dzierzynski
(74) *Attorney, Agent, or Firm* — Lee & Hayes, PLLC

(57) ABSTRACT

In some examples, a projection display surface is configured to reflect a first image or image portion in a first direction and a second image or image portion in a second direction. In some cases, first light corresponding to the first image is projected onto a display surface that includes a first plurality of reflectors configured to reflect the first light in a first direction, but not reflect second light corresponding to the second image. The display surface may further include a second plurality of reflectors to reflect the second light in a second direction, but not reflect the first light. In some examples, the first light is within a first wavelength range and the second light is within a second, different wavelength range. In other examples, the first light has a first polarization and the second light has a second, different polarization.

22 Claims, 16 Drawing Sheets

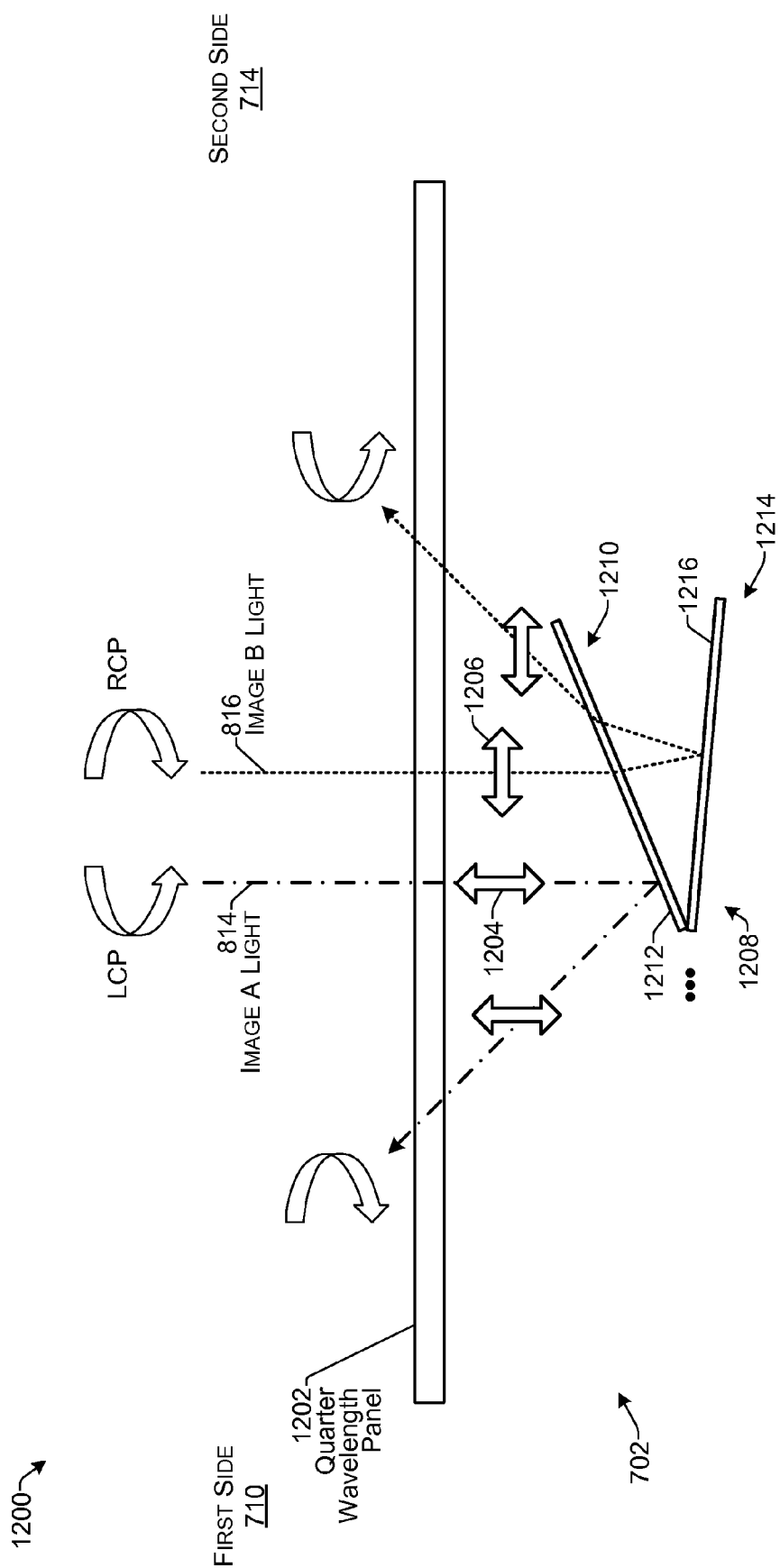

1500 ⟶

```
┌─────────────────────────────────────────────────────────────────┐
│ PROJECTING FIRST LIGHT CORRESPONDING TO A FIRST IMAGE ONTO A    │
│ DISPLAY SURFACE THAT INCLUDES A FIRST PLURALITY OF REFLECTORS   │
│ CONFIGURED TO REFLECT THE FIRST LIGHT IN A FIRST DIRECTION, BUT │
│ NOT REFLECT SECOND LIGHT CORRESPONDING TO A SECOND IMAGE,       │
│ AND A SECOND PLURALITY OF REFLECTORS TO REFLECT THE SECOND      │
│ LIGHT IN A SECOND DIRECTION, BUT NOT REFLECT THE FIRST LIGHT    │
│                             1502                                │
└─────────────────────────────────────────────────────────────────┘
                                   │
                                   ▼
┌─────────────────────────────────────────────────────────────────┐
│ PROJECTING THE SECOND LIGHT CORRESPONDING TO THE SECOND         │
│ IMAGE ONTO THE DISPLAY SURFACE, SUCH THAT THE FIRST IMAGE IS    │
│ REFLECTED IN THE FIRST DIRECTION AND THE SECOND IMAGE IS        │
│             REFLECTED IN THE SECOND DIRECTION                   │
│                             1504                                │
└─────────────────────────────────────────────────────────────────┘
```

FIG. 15

DIRECTIONAL PROJECTION DISPLAY

BACKGROUND

A projector may project an image onto a projection display screen or other projection display surface. The image projected onto the display surface is typically viewable by anyone who is able to view the display surface. For instance, except in the case of extreme viewing angles, if the viewer is able to see the entire display surface, the viewer is usually able to view the entire image projected onto the display surface. Thus, projection displays typically do not afford the capability for a viewer to be presented with an image that is not also visible other viewers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 12A and 12B illustrate example reflector configurations of display surfaces for use with polarized light.

FIG. 15 is an example flow diagram that describes a process that includes displaying one or more images on a projection display with directional control according to some implementations.

DETAILED DESCRIPTION

This disclosure describes techniques and arrangements for providing directional control over projected images. The techniques may be applied to a display medium or display surface that reflects light projected from a projector, such as for presenting one or more images to one or more users. In some examples, a first image may be presented to a first user able to view the display surface, while a second, different image may be presented to a second user also able to view the display surface. For instance, even though both users are able to view the display surface, the first user may not be able to view at least a portion of the second image being presented to the second user and the second user may not be able to view at least a portion of the first image being presented to the first user. Consequently, multiple users may use the same projection display surface at the same time while enabling a certain level of privacy or exclusivity between the users.

The images may be projected onto the display surface by a projection system. The projection systems described herein may be employed in a variety of environments such as conference rooms, classrooms, homes, offices, casinos, movie theaters, gaming establishments, and so forth. Typical projection systems may include a projector configured to emit light focused toward a projection display surface. The display surface in turn is configured to reflect and scatter the projected light so that the projected image is presented to one or more users. The display surface may be fixed, such as in the case of a display surface that mounts to a wall, a table or a stand. Alternatively, or additionally, the display surface may be portable, such as a handheld projection display screen.

In some examples, the display surfaces described herein may be used in augmented reality environments that include systems of resources such as cameras, projectors, computing devices with processing and memory capabilities, and so forth, which may perform the processes described herein. The projectors may project images onto the surroundings that define the environment or may cause various operations to be performed within the environment. Moreover, cameras and microphones may monitor and capture user interactions with devices, and these inputs may be used, in part, to determine one or more images to present to particular users, such as to a user that has been determined to be at a particular location with respect to a particular display surface.

Figure 1:
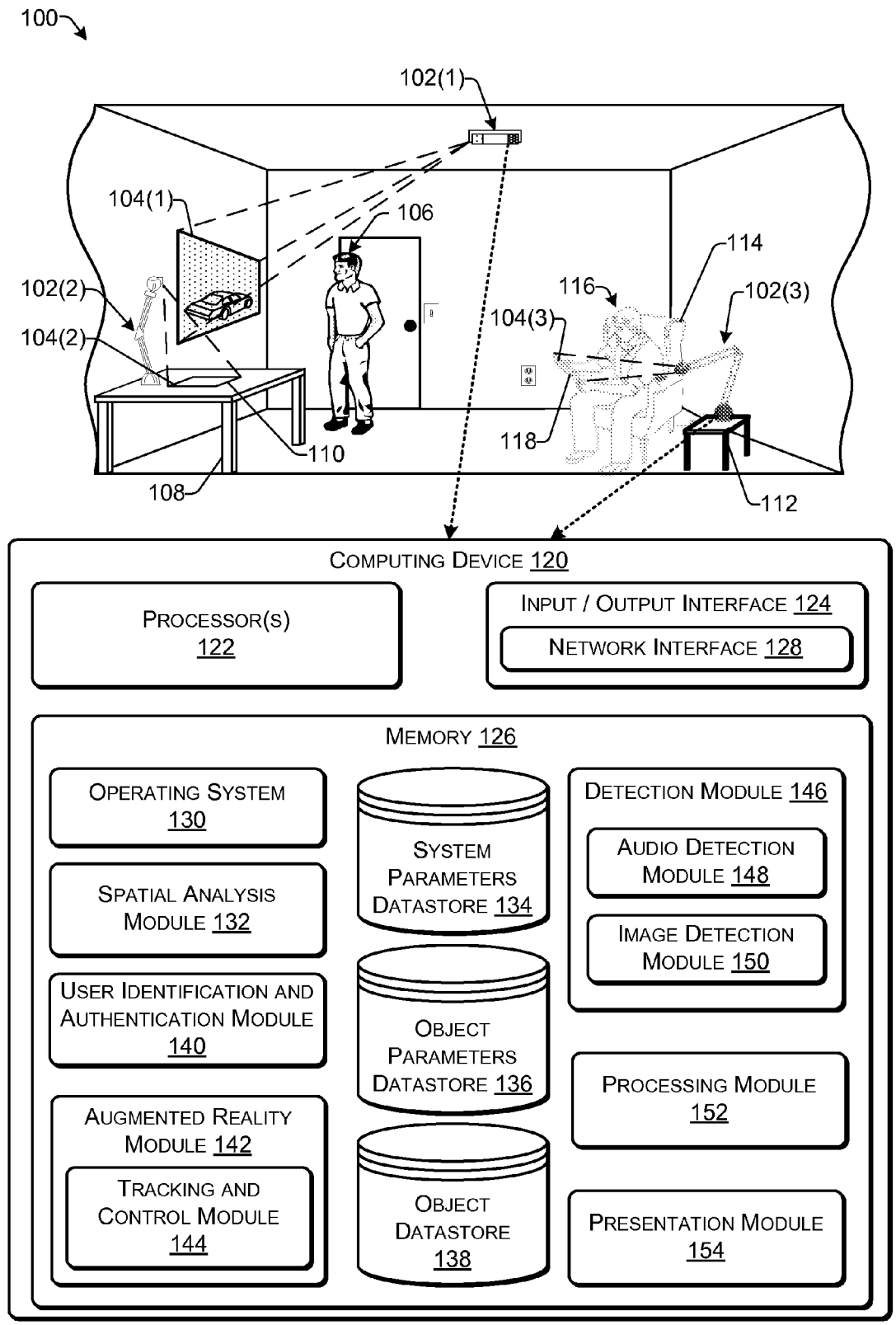
FIG. 1 illustrates an example environmental area, such as a room, in which one or more directional display surfaces may be employed.

FIG. 1 depicts an example environment 100 in which a directional projection display may be used. The environment 100 may include one or more projectors. In the illustrated example, at least one projector is included in an augmented reality functional node (ARFN). However, in other examples, the projector is not associated with an ARFN, but may instead be a stand-alone projector or a projector associated with a different type of projection system, display system, media system, computer system, gaming system, theater system, or the like. For example, the projectors and the display surfaces herein may be associated with any type of computing device, home electronics, automotive electronics, commercial electronics, and so forth. Further, while a front projection system is shown in some examples, other examples may use a rear projection system, a light guided or edge-illuminated projection system, or any other suitable projection arrangement.

In FIG. 1, the environment 100 includes three ARFN 102 (1)-(3) shown within the room. Each ARFN 102 contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102

(1) projects images onto the scene, such as onto a display surface 104(1) on a wall of the room. A first user 106 may watch and interact with the images being projected onto the wall, and the ceiling-mounted ARFN 102(1) may capture that interaction. In addition, the ARFN 102(1) may detect a location of the user or actions taken by the user within the room (e.g., gestures) or sounds output by the user. In response, the ARFN 102(1) may identify operations associated with those locations, gestures or sounds and cause those operations to be performed within the room. One implementation of the first ARFN 102(1) is provided below in more detail with reference to FIG. 2.

A second ARFN 102(2) may be embodied as a table lamp, which is shown sitting on a desk 108 in the example of FIG. 1. The second ARFN 102(2) projects images 110 onto a display surface 104(2) of the desk 108, and the user 106 view and interact with the projected images 110. The projected images 110 may be of any number of things, such as homework, video games, news, recipes and so forth.

A third ARFN 102(3) is also embodied as a table lamp, shown sitting on a small table 112 next to a chair 114. A second user 116 is seated in the chair 114, holding a user device 118. The third ARFN 102(3) projects images onto the display surface 104(3) of the user device 118 for the user 116 to consume and interact with the projected images. The projected images may be of any number of things, such as books, games (e.g., crosswords, Sudoku, etc.), news, magazines, movies, browser, etc. The user device 118 may be essentially any device for use within an augmented reality environment, and may be provided in several form factors. The user device 118 may range from an entirely passive, non-electronic, mechanical surface to a fully functioning, fully processing, electronic device with a projection display surface. For instance, the user device 118 may be a display surface or display medium that includes one or more features with which the user may interact.

In the example illustrated in FIG. 1, any of the display surfaces 104(1)-104(3) may be directional projection display surfaces as described herein. Further, these examples illustrated are just sample locations and implementations. In other implementations, one or more ARFNs may be placed around the room in any number of arrangements, such as in or on furniture, on a wall, on the floor, beneath a table, and so forth.

Associated with each ARFN 102(1)-(3), or with a plurality of ARFNs 102, is a computing device 120, which may be located within the augmented reality environment 100 or disposed at another location external to the environment 100. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions, which may include analyzing a scene to generate a topology, recognizing objects in the scene, dimensioning the objects, and creating a three-dimensional (3D) model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN 102, and so forth. For example, system parameters may include current pan and tilt settings of the cameras and projectors, an orientation of a projector toward a display surface, and so forth. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene that are temporally persistent, such as walls, a particular table, particular users, and so forth may be stored within the object datastore 138.

The object datastore 138 may be stored on one or more of the memory of the ARFN, storage devices accessible on the local network, or cloud storage accessible via a wide area network.

In addition, the object datastore 138 may maintain a library of sounds or particular frequencies that are associated with different operations that may be performed within the environment. As a result, upon one of the ARFNs 102 detecting a particular sound or frequency within the environment, the ARFN may identify a corresponding operation (e.g., adjust volume, project an image, etc.) and then cause that operation to be performed.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

Further, according to some implementations, the user identification and authentication module 140 may distinguish one user from another user for enabling the system to project a first image or image portion to a first user and a second, different image or image portion to a second user on the same display surface 104. For example, if the users are playing a game, and move from using one display surface 104 to using a different display surface 104, the system may automatically determine the respective locations and orientations of the users for properly projecting a desired image onto the new directional display surface.

An augmented reality module 142 is configured to generate augmented reality output in concert with the physical environment. In some examples, the augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

In addition, and as stated above, the memory 126 may maintain, or may be otherwise associated with, a detection module 146. As shown, the detection module 146 may include an audio detection module 148 and an image detection module 150. In various implementations, a user 106 may interact with the environment for the purpose of causing one or more operations to be performed within the environment. For example, the audio detection module 148 may detect (e.g., via a microphone) sounds or voice commands. Further, the image detection module 150 may detect one or more actions or gestures performed by the user 106 via a camera (e.g., a still image camera or a video camera).

Upon detecting the particular output by a user or the user device 118, a processing module 152 may determine one or more operations that are associated with the detected output. In particular, the ARFN 102 may maintain or be associated with a database that maps various sounds, frequencies, and/or user actions to particular operations that may be performed within the environment. That is, in response to the user 106 performing some action, the processing module 152 may identify a specific operation. If a desired display surface 104 for directional projection has been identified by the processing module 152, the presentation module 154 may cause projection of a particular image or images onto the display surface. Accordingly, the presentation module 154 may cause an image to be projected, which may be caused by a user interacting with the environment.

As one example, if two or more users are sitting at the table 108, a voice command or other sound or gesture may be used to request display of a game on the display surface 104(2). Further, in some types of games, such as Battleship®, Scrabble®, card games, etc., it is desirable that one user not be able to view information displayed to another user. Accordingly, the presentation module 154 may display the image of the game in a manner such that at least one of the users cannot see at least a portion of an image presented to at least one other user. Various techniques for achieving this type of presentation are described additionally below.

Figure 2:
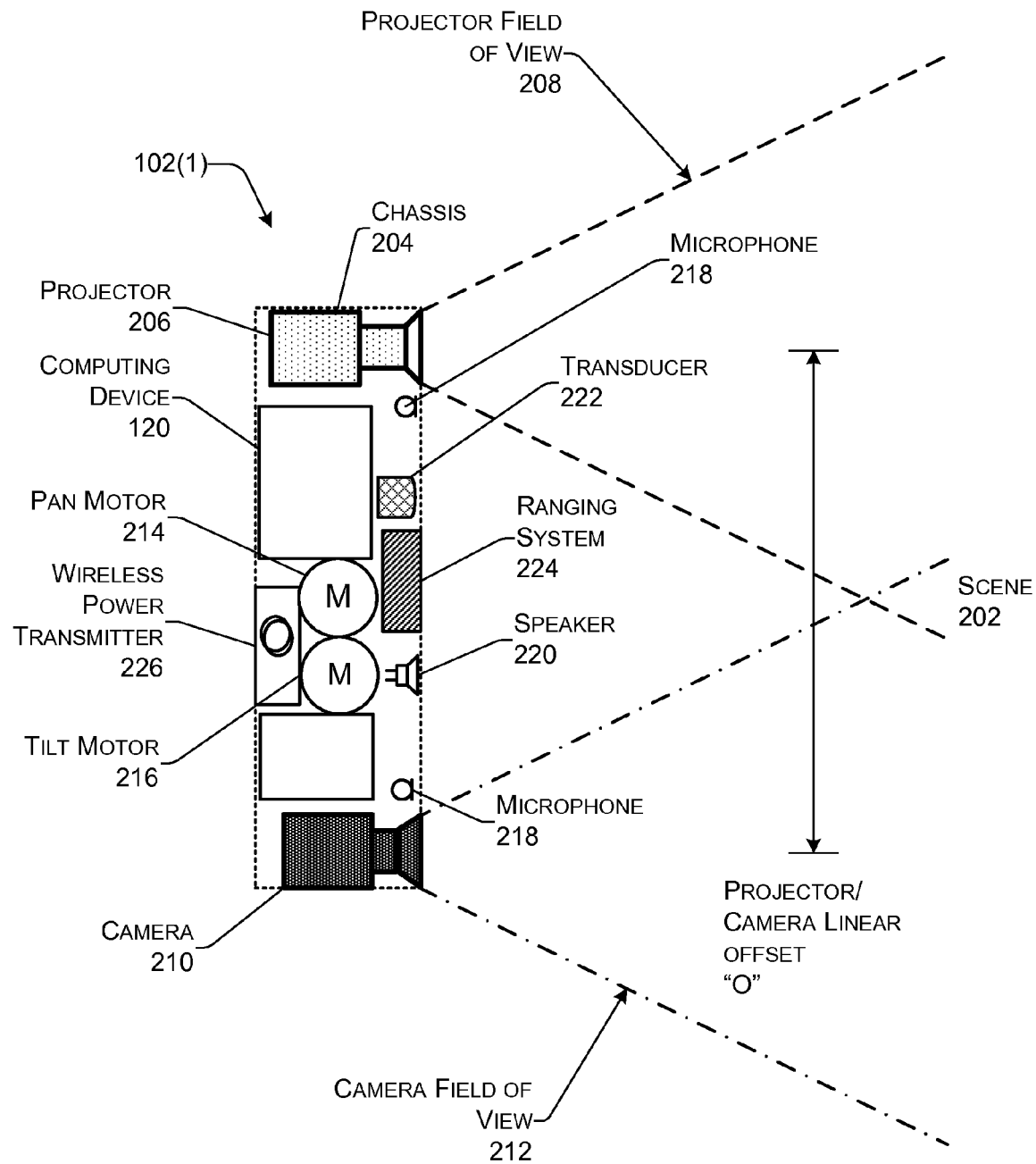
FIG. 2 illustrates an implementation of a projection and image capturing system including a projector and camera in spaced relation to one another. In this implementation, the projector and camera have different optical paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 that describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) 210 and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera 210 may be embodied a red, green, blue (RGB) camera 210. In other instances, the camera 210 may include time of flight (ToF) sensors. In still other instances, the camera 210 may be a red, green, blue, z-depth (RGBZ) camera 210 that includes both ToF and RGB sensors. The camera 210 has a camera field of view 212, which describes a particular solid angle. The camera field of view 212 may vary according to changes in the configuration of the camera 210. For example, an optical zoom of the camera 210 may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 132 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene and/or the user device 118. For example, the user may make a particular noise, such as a tap on a wall or snap of the fingers, which are pre-designated to initiate an augmented reality function. The user may alternatively use voice commands. The user may also interact with the user device 118, which may cause the user device 118 to output particular sounds or frequencies. Such audio inputs may be located within the scene using time-of-arrival differences among the microphones and used to summon an active zone within the augmented reality environment. Further, the microphones 218 may be used to receive voice input from the user for purposes of identifying and authenticating the user.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as non-passive user device 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O." This offset is the linear distance between the projector 206 and the camera 210. Placement of the projector 206 and the camera 210 at distance "O" from one another may aid in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. In addition, the angle of the projector 206 and the camera 210 relative to the chassis 204 may vary.

Due to this offset "O," the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
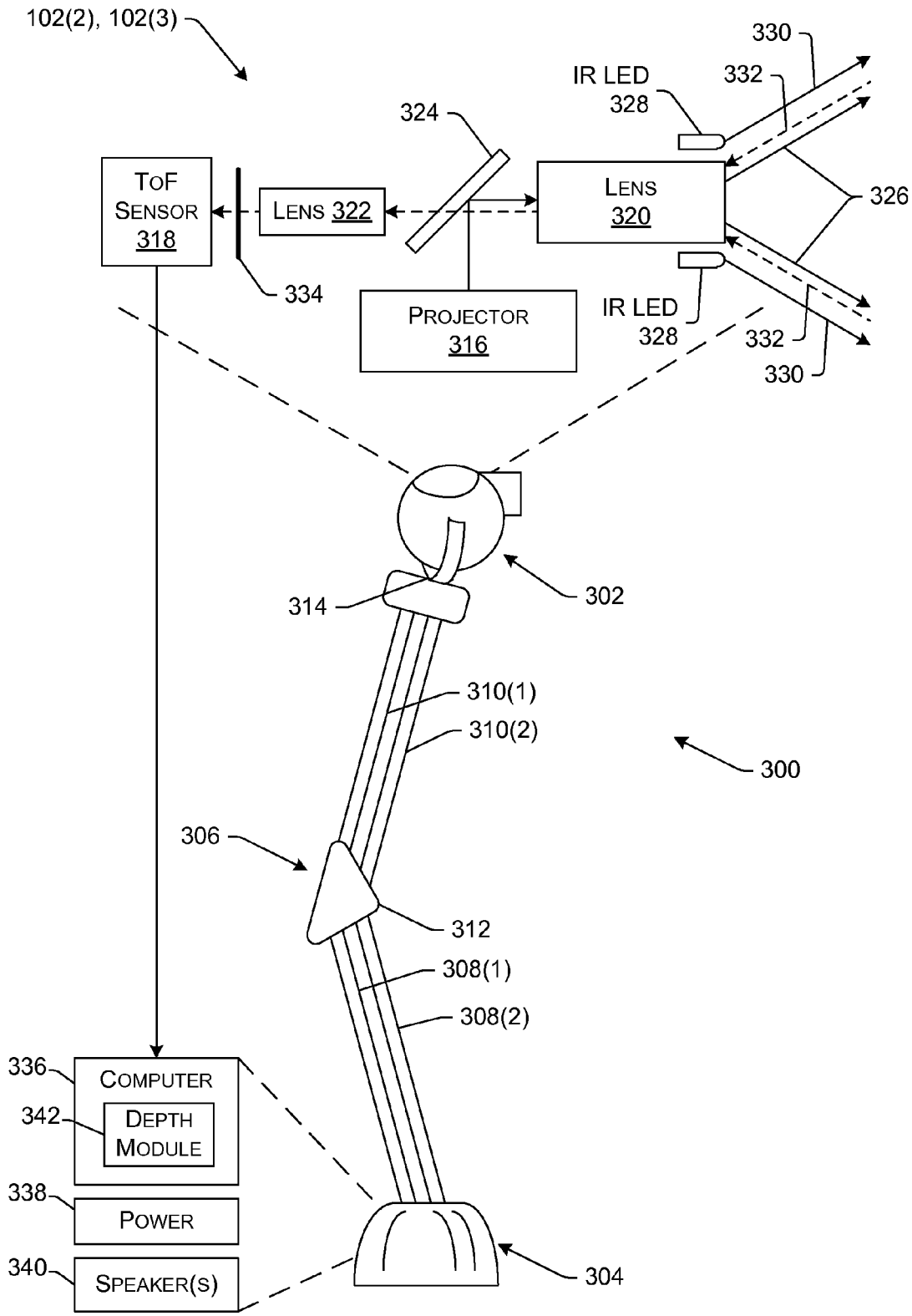
FIG. 3 illustrates an implementation of a projection and image capturing system formed as a familiar type of furniture, such as a table lamp. In this implementation, the projector and camera may share a common optical path through a common lens.

FIG. 3 illustrates one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 300 has a head 302 attached to a base 304 by a movable arm mechanism 306. As illustrated, the arm mechanism 306 has two base members or rods 308(1) and 308(2) connected to two head members or rods 310(1) and 310(2) via a joint connector 312. Other configurations of the arm mechanism 306 may be used. In the illustrated implementation, the head 302 is connected to the arm mechanism 306 via a universal connector 314 that enables at least two degrees of freedom (e.g., along tilt and pan axes). The universal connector 314 is described below in more detail with reference to FIG. 6. In other implementations, the head 302 may be mounted to the arm mechanism 306 in a fixed manner, with no movement relative to the arm mechanism 306, or in a manner that enables more or less than two degrees of freedom. In still another implementation, a pan may be coupled to the base 304 to enable rotation of the arm mechanism 306 and the head 304.

The head 302 holds several components, including a projector 316 and a ToF sensor 318. In this example, the ToF sensor 318 measures IR signal reflections from objects within the scene. The ToF sensor 318 may be implemented as a standalone sensor, or as part of a camera 210. The head 302 also contains one or more lenses, including a first lens 320 and a second lens 322. The first lens 320 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 320 may further include a motorized focus, a motorized zoom, and a motorized iris.

The second lens 322 is provided to adjust for the differences between the projection imager and the ToF imager. This allows for the device to set relative coverage of the two imagers (e.g., overscan/underscan).

The projector 316 projects an image that is reflected off an angled beam splitter 324 and out through the lens 320. For example, the beam splitter 324 may be embodied as a dichroic beam splitter having a coated prism assembly that employs dichroic optical coatings to divide light. The projected image has a field of view represented by the outgoing pair of arrows 326. In this manner, the visible and high intensity light from the projector can be zoomed for image projection on a wide range of surfaces, from near view to far view surfaces.

One or more IR emitters 328, such as IR LEDs, are positioned in the head 302 relative to the lens 320. The IR emitters 328 direct IR light in the direction of the projected image to illuminate the scene onto which the images are being projected. The IR emitters 328 may be arranged such that the illumination field is wider than the projected field, as represented by the outgoing pair of arrows 330.

The IR signals are scattered from objects in the scene and returned to the lens 320, as represented by the incoming pair of arrows 332. The captured IR signals are passed through the lens 320 and through the dichroic beam splitter 324 to the secondary lens 326. The IR signals are then optionally passed through an IR filter 334 (or other filter type) to the ToF sensor 318. In other implementations, the IR signals may be passed directly from the lens 322 to the ToF sensor 318, without going through the IR filter 334. Accordingly, the IR signals are emitted out from the head 302, scattered by the objects, and collected by the head 302 for capture by the ToF sensor 318 as a way to image the scene. This technique is performed in lieu of using structured light, as implemented in the implementation of the first ARFN 102(1).

It is noted that, in other implementations, the projector 316 may be arranged to project an image that is passed through the beam splitter 324 and out through the lens 320, rather than being reflected by the beam splitter 324. In this arrangement, the returning IR signals maybe received back through the lens 320 and reflected by the beam splitter 324 to the lens 322 and ToF sensor 318. Said another way, the projector 316 and IR components (i.e., ToF sensor 318, lens 322 and optionally filter 334) may be swapped so that the returning IR signals are reflected by the beam splitter 324 rather than the projected image. Other arrangements may also be possible where at least part of the optical path is shared by the projection and depth capture.

The lamp-based ARFN 102(2) or 102(3) may also be equipped with one or more components in the base 304. In this example, a computer 336 resides in the base 304, along with power components 338 and one or more speakers 340. The computer may include processing and memory to execute instructions. A depth module 342 may be executed by the computer 336 to measure a time of flight for an IR signal (or other modulated light output). The time-of-flight value may be derived as a function of a time elapsed between emission from an IR LED 328 and capture by the ToF sensor 318. Alternatively, the time-of-flight value may be derived as a function of the phase difference between the modulated light output and the returned light. The depth module 342 may be implemented in software or hardware. It is noted that in other implementations, the components shown as residing in the base 304 may reside in the head 302 or arm mechanism 306. For instance, the computer 336 may be located in the head 302, and the speakers may be 340 may be distributed in multiple locations, including the base, arm mechanism, and/or the head.

In the implementation of FIG. 3, the projector 316 and the sensor 318 share a common optical path through a common lens 320. As a result, the ARFN may be made more compact to a smaller form factor, as one set of lenses are removed in this design as compared to the offset design discussed above with respect to FIG. 2.

Figure 4:
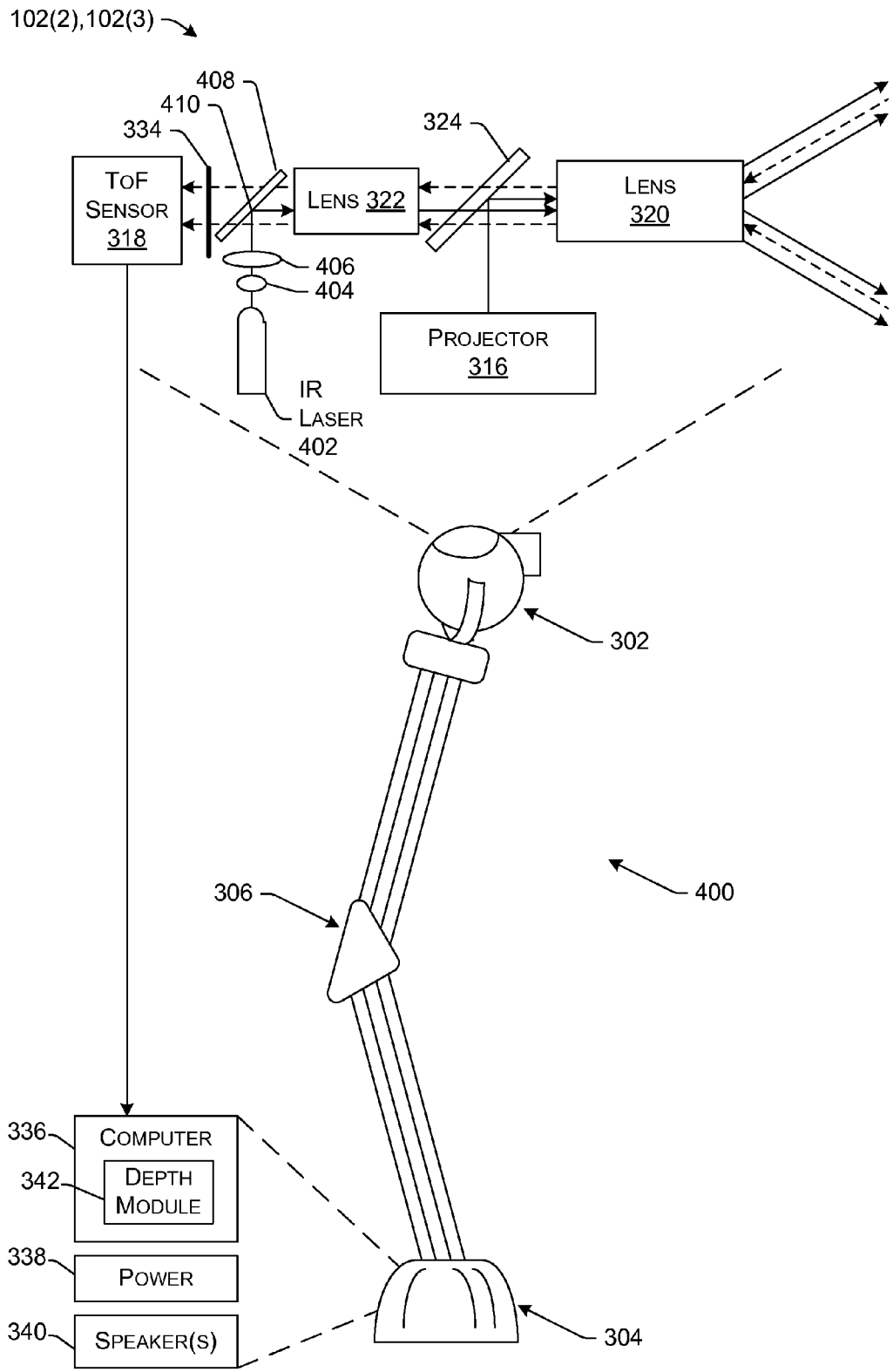
FIG. 4 illustrates an implementation of a projection and image capturing system formed as a table lamp similar to the implementation illustrated in FIG. 3. In this example, the projector and camera may share a common optical path through a common lens, and one or more illumination components may also share the same optical path.

FIG. 4 illustrates another implementation of the ARFN 102(2) or 102(3), also shown implemented as part of a table lamp 300. This implementation differs from that of FIG. 3 in that the illumination system also shares the same optical path as the projector 316 and the ToF sensor 318.

In FIG. 4, an IR laser 402 is used in place of the IR LEDs 328 of FIG. 3. The IR laser 402 outputs an IR beam that is expanded by a beam expander 404 and then concentrated by a focus lens 406 onto an angled beam splitter 408. In one implementation, the angled beam splitter 408 is formed of a material that passes light (e.g., glass) and has a reflective patch 410 at its center. The focus lens 406 concentrates the IR beam onto the reflective patch 410 of the beam splitter 408, which directs the beam through lens 322, through the beam splitter 324, and out through the lens 320. The reflective patch covers the center portion of the beam splitter 408 and may have any number of shapes, such as circular, oval, polygonal, and so forth. With this arrangement, the size and area of interest can be controllably illuminated by use of the lens 320 and modulated IR laser light. The illuminated area is roughly the same size, or slightly larger, than the area onto which images are projected, as is shown in more detail with reference to FIG. 5.

IR signals scattered from a populated landscape are then collected by the head 302 and passed back through the lens 320, through the beam splitter 324, through lens 322, through the non-reflective portion of the angled reflector 408, through the filter 334, and to the ToF sensor 318. Accordingly, the collected scattered IR light forms an image on the ToF sensor 318 that may be used to compute time of flight values for depth analysis of the landscape of the scene.

One of the advantages of placing the IR laser 402 as shown and passing the IR beam through the lens system is that the power used for illumination may be reduced as compared to the implementation of FIG. 3, where the IR LEDs are external to the optical path. Illumination typically degrades inversely proportional to the square of the distance. In FIG. 3, the forward and return paths result in an illumination inversely proportional to the distance to the power of four. Conversely, illumination through the same lens means that the returned light is inversely proportional to square of the distance, and therefore can use less intense illumination to achieve the same results.

Further, essentially any IR device may be used in the systems herein. Although IR LEDs and IR lasers are shown in the implementations of FIGS. 3 and 4, essentially any device that produces energy within the IR spectrum may be used, such as, for example, a regular red LED.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Figure 5:
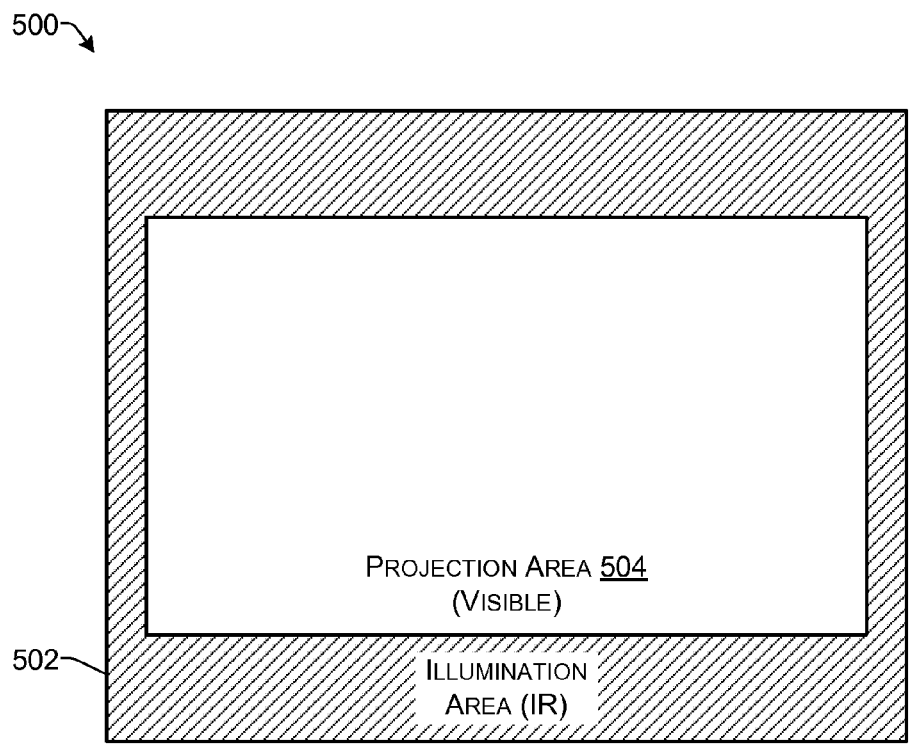
FIG. 5 illustrates a first area of illumination and a second area of image capture that may be realized by the lamp examples illustrated in FIGS. 3 and 4.

FIG. 5 shows a coverage pattern 500 provided by the ARFN 102(2) or 102(3). The coverage pattern 500 has an illumination area 502 covered by the IR-based illumination system. The coverage pattern 500 also has a projection area 504 covered by the projected image. As shown in this footprint, the illumination area 502 is larger than, and encompasses, the projection area 504. However, in other implementations, the illumination area 502 may be equal to or smaller than, and be encompassed by, the projection area 504. The second lens 322 in the device allows for adjustment in the relative coverage to enable overscan or underscan conditions.

Figure 6:
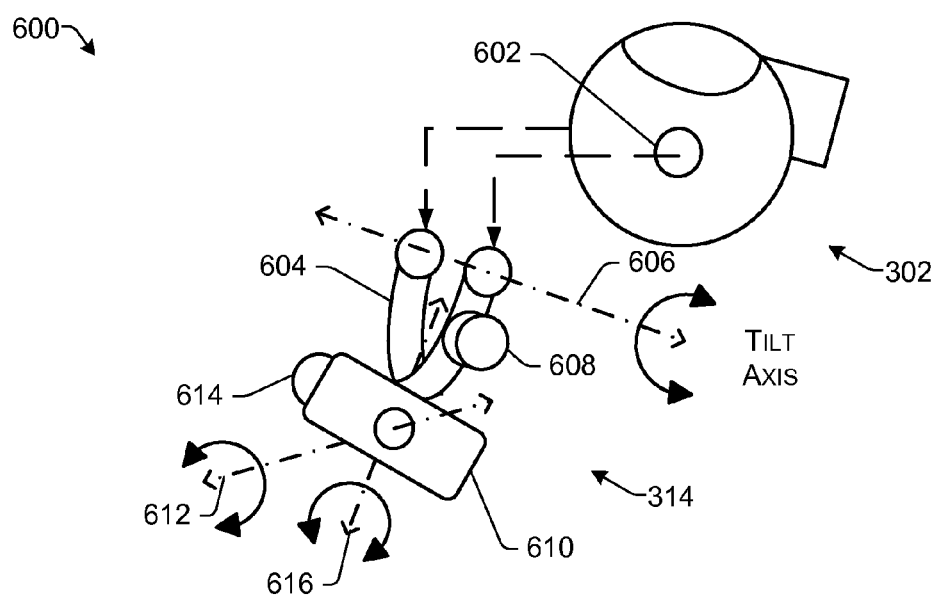
FIG. 6 shows an exploded view of a head and universal mount of the lamp examples illustrated in FIGS. 3 and 4.

FIG. 6 shows an exploded view 600 of the head 302 and the universal mount 314 of the lamp implementation shown in FIGS. 3 and 4. Here, the head 302 is generally spherical, although it may be made of any shape, size or form factor. The head 302 has two mounting members 602 on opposing sides of the sphere. The mounting members 602 may be pivotally mounted within a U-shaped cradle 604 to facilitate rotation about a tilt axis 606. A tilt motor 608 may be included to move the head 302 about the tilt axis 606.

The U-shaped cradle 604 is movably mounted relative to structural bracket 610. The U-shaped cradle 604 may be pivoted about a pan axis 612. A pan motor 614 may be included to pivot the U-shaped cradle 604 and head 302 about the pan axis 612. Additionally, the U-shaped cradle 604 may be rotatable about an axis 616 to rotate or spin relative to the structural bracket 610.

Figure 7:
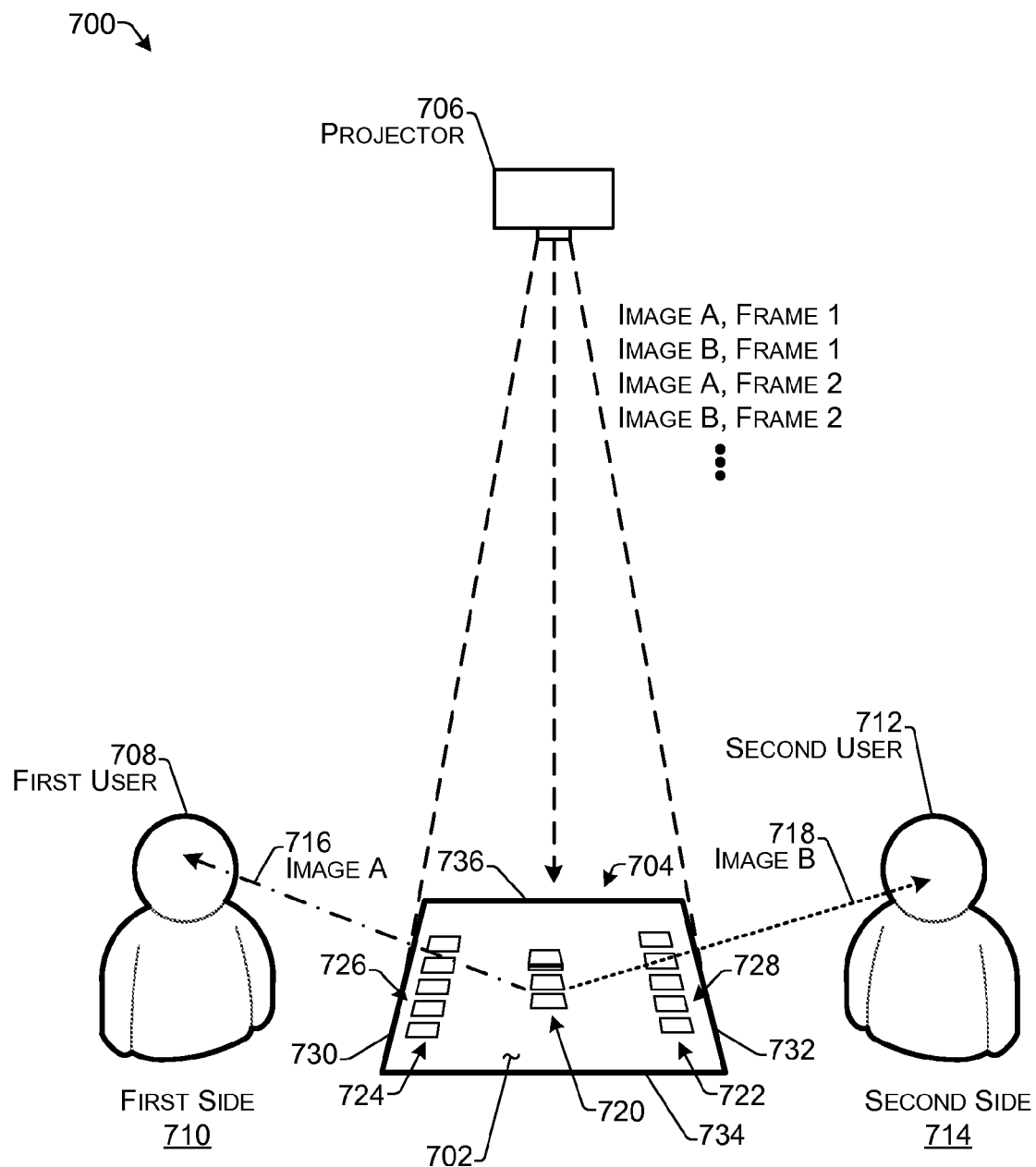
FIG. 7 illustrates an example system for a directional projection display according to some implementations.

FIG. 7 illustrates an example of a system 700 that includes a directional projection display surface 702 for receiving and displaying one or more projected images 704. As one example, multiple users may use the display surface 702 at the same time while enabling a certain level of privacy or exclusivity between the users. For example, at least one of the users may not be able to see an image or a portion of an image that is visible to another one of the users. This arrangement may allow various types of applications, such as gaming applications, educational applications, and so forth, in which a portion of content is made visible to one user but is hidden from one or more other users.

In the example of FIG. 7, a projector 706 projects the one or more images 704 onto the display surface 702. The projector 706 may be any of the projectors discussed above such as those incorporated into the augmented reality functional nodes (ARFNs) 102, or any other suitable projector, depending on the desired use and purpose of the display surface 702 and the environment of use. In this example, a first user 708 is located toward a first side edge or side 710 of the display surface 702 while a second user 712 is located toward a second side edge or side 714 of the display surface 702. In this example, the first side 710 is a side of the display surface opposite to the second side 714 of the display surface. The first user 708 may view a first image or first image portion 716, referred to as image A in this example, while the second user may view a second image or second image portion 718, referred to as image B in this example.

As one example, suppose that the users 708 and 712 are playing a computer image based virtual card game projected onto the display surface 702 as the one or more projected images 704. In the card game, the cards in each user's "hand" are kept hidden from the other user but other cards 720 that are currently in play are visible by both users on the display surface 702. Accordingly, the image A presented to the first user 708 includes the faces of cards 722 in the first user's hand and the other cards 720 that are in currently in play and visible on the display surface 702. Similarly, the image B presented to the second user 712 includes the faces of cards 724 in the second user's hand and the other cards 720 that are currently in play and visible on the display surface 702. Consequently, the first user 708 is unable to see the faces of the cards 722 in the second user's hand and the second user 712 is unable to see the faces of the cards 724 in the first user's hand, but both users are able to see their own cards and the cards 720 currently in play.

Further, each user is able to view the entire display surface 702, and thus, different images may be presented to the different users 708 and 712 on the same parts of the display surface 702. For instance, in a location 726 on the display surface 702 where the first user's cards 724 are displayed to the first user 708, image B which is displayed to the second user, may display the cards 724 so that the cards 724 appear to be face down to represent the cards currently in the first user's hand. Similarly, at a location 728 on the display surface 702, image A may present a similar view to the first user 708, showing the second user's cards 722 face down. Numerous other applications will be apparent to those of skill in the art having the benefit of the disclosure herein, with the foregoing being merely one example described for illustrative purposes.

Various techniques described herein may be employed to present private or semi private images to individual users, as described above, which are visible to a first user but not visible to another user despite the other user being able to view the same portions of the display surface as the first user. As one example, the display surface 702 may include a surface treatment or configuration such that a first type of light having a first property or value is reflected in a direction of a first edge 730 or generally toward the first side 710, but not in a direction of a second edge 732 or toward the second side 714. Similarly, a second type of light having a second property or value is reflected in a direction of the second edge 732 or generally toward the second side 714, but not reflected toward the first side 710 or in the direction of the first edge 730. According to some examples, the first type of light may differ from the second type of light in at least one of a range of spectral wavelength of the light or a type of polarization applied to the light. Thus, with a single projector 706, the frames of image A and image B may be alternated, i.e., image A, frame 1 of the first type of light is projected, then image B, frame 1, is projected, and so forth, to provide image A to the first user on the first side 710 and to provide image B to the second user on the second side 714. For example, if the projector 706 is operated at a frequency of 120 frames per second, then image A may be presented at 60 frames per second to the first user 708, and image B may be presented at 60 frames per second to the second user 712. Alternatively, as discussed additionally below, multiple projectors may be used in some examples, rather than alternating frames of two different images with a single projector.

Further, in some examples, a third type of light and/or a fourth type of light may be projected onto the display surface 702 and reflected in a third direction and a fourth direction, respectively. For example, the third type of light may be reflected exclusively in a direction toward a third edge 734 on a third side of the display surface 702, while the fourth type of light may be reflected exclusively in a direction toward a fourth edge 736 on a fourth side of the display surface 702. Additionally, implementations herein are not limited to four mutually exclusive directions or four different types of light, but may include additional directions and additional types of light, depending on the configuration of the display surface and the intended use.

Figure 8A:
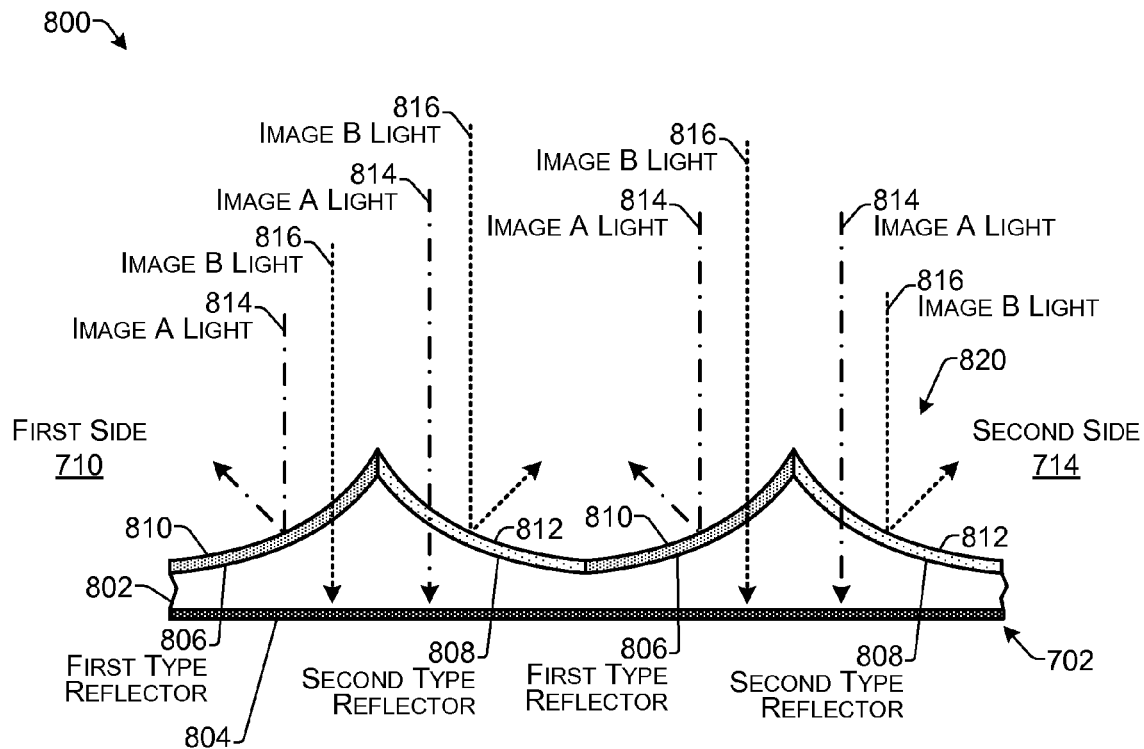
FIGS. 8A and 8B illustrate example reflector configurations of a display surface according to some implementations.
Figure 8B:
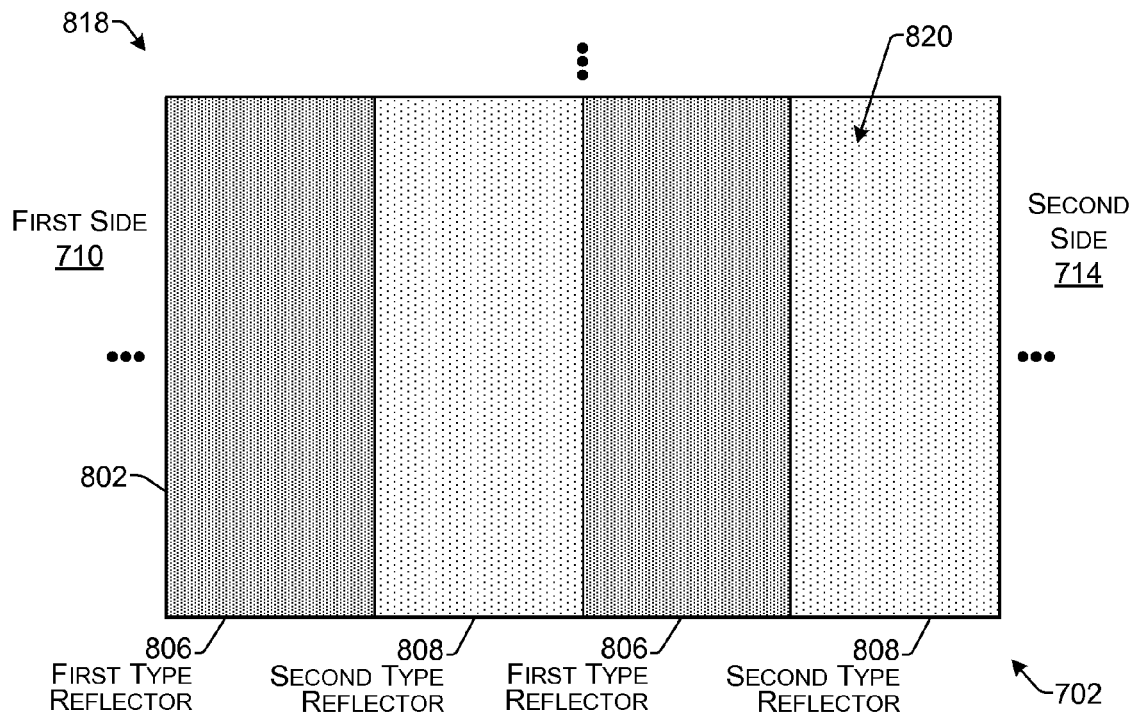

FIGS. 8A and 8B illustrate one example of a surface treatment or configuration of the display surface 702 that may be used to achieve the directional reflective effect described above. FIG. 8A is an enlarged cross-sectional view 800 of the display surface 702. In this example, the display surface 702 includes a thin sheet or substrate 802 of suitable optically transparent material, such as acrylic, glass, or other optical waveguide material. The substrate 802 may include a light absorber 804 positioned behind or under the front surface of display surface 702. The light absorber 804 may be a light-absorbing matrix or other light absorbing substance able to absorb light passing through the front surface of the substrate 802 to prevent reflection back through the front surface. For example, the light absorber 804 may be a layer of material integrated into the substrate 802, such as in the case of a matrix of black acrylic. Alternatively, the light absorber 804 may be applied, deposited or coated onto the back surface of the substrate 802, or deposited within the substrate 802. As some additional examples, the light absorbing material may be or may include black glass, carbon black or a dark pigment.

The substrate 802 may include a plurality of reflectors on the upper or reflective surface of the substrate 802. In this example, in which there are two different images to be projected to the two different sides 710, 714, there are two different types of reflectors, i.e., a first type of reflector 806 for reflecting light of a first type corresponding to a first image toward the first side 710, and a second type of reflector 808 for reflecting light of a second type corresponding to a second image toward the second side 714. In other examples in which three, four, or more images are to be projected to multiple different users, there may be additional types of reflectors formed on the reflective surface of the substrate 802 and oriented in other directions.

In some examples, each reflector 806, 808 may be shaped as an off-axis parabolic or paraboloidal reflector when viewed in cross-section, as in FIG. 8A. Thus, in some examples, the reflective surfaces of the reflectors 806, 808 may be at least partially paraboloidal. In other examples, the reflective surfaces of the reflectors 806, 808 may be ellipsoidal or at least partially ellipsoidal. In still other examples, the reflectors 806, 808 may be formed having a flat reflective surface or any other suitable type of arcuate or concave reflective surface. Furthermore, the reflectors may be 806, 808 of any suitable size to achieve a desired reflective effect. For instance, in some examples, the reflectors may be sized approximately on the scale of individual pixels of the projected image, while in other examples the reflectors may be larger or smaller, depending on the material of the display surface 702 and the manufacturing techniques employed. As one example, the reflectors 806, 808 of FIGS. 8A-8B may have a width and height approximately the size of a projected pixel, such as in the range of 100-1000 microns, while a length of the reflectors 806, 808 may match the length of the display surface 702 in this example.

As illustrated in FIG. 8B, the reflectors 806, 808 may be embossed or otherwise formed in alternating parallel lines onto the upper surface of the display surface 702 along an axis generally perpendicular to a desired direction of reflection. FIG. 8B is a plan view 818 looking down on an upper surface 820 of an enlarged rectangular portion of the display surface 702. In this example, the reflectors 806, 808 are formed in parallel lines in a lenticular fashion. However, other reflector configurations may alternatively be used in the implementations herein, as discussed additionally below. Accordingly, the cross-sectional view of FIG. 8A and the plan view of FIG. 8B are substantially enlarged and there may be hundreds or many thousands of the reflectors 806, 808 formed on the upper surface 820 of the display surface 702.

The respective surfaces of the reflectors 806, 808 may be coated or treated differently to reflect different types of light, while allowing passage of other types of light. Accordingly, the first type of reflector 806 may have a first surface coating or treatment 810, while the second type of reflector 808 may have a second surface coating or treatment 812, which is different from that of the first surface treatment 810. As a simple example described in terms of monotone images, suppose that image A is projected using red light (image A light 814), while image B is projected using blue light (image B light 816). Thus, the light of image A is a first type of light (i.e., in a first wavelength range) that differs from a second type of light corresponding to image B (i.e., in a second wavelength range).

The surface treatment 810 of the first reflectors 806 may be configured to reflect red light and allow other wavelengths of light to pass through and be absorbed by the light absorber 804. Similarly, the surface treatment 812 of the second reflectors 808 may be configured to reflect blue light, while allowing other wavelengths of light to pass through. Accordingly, the first type of reflectors 806 reflect the image A light 814 toward the first side 710 while allowing the image B light 816 to pass through the surface treatment 810. Similarly, the second type of reflectors 808 reflect the image B light 816 toward the second side 714 while allowing the image A 814 light to pass through the surface treatment 812. Thus, the reflectors 806 and 808 reflect the different types of light at an oblique, perpendicular, opposed or otherwise different direction with respect to one another. The first direction in which the first reflectors 806 reflect light may be sufficiently different from the second direction in which the second reflectors 808 reflect light such that a user able to view the image reflected from the first reflectors 806 is substantially unable to view an image reflected from the second reflectors 808 and vice versa. The light absorber 804 portion of the substrate 802 may substantially absorb the non-reflected light and prevent the non-reflected light from passing back out of the upper surface 820 of the substrate 802. Further, a suitable diffuser or diffusing layer (not shown) may be used with some implementations herein.

Generalizing the above example, the first type of reflectors may be dichroically coated to reflect a first spectrum of light, while the second type of reflectors may be dichroically coated to reflect a second, different spectrum of light. Furthermore, the examples herein are not limited to monochrome imaging, but may also include full color imaging. For instance, one example for achieving directional color imaging may include six wavelength bands that are separable from each other using dichroic coatings that provide accurate color filters, such as rugate filter thin film coatings. Thus, image A may use red, green and blue light, each in a first respective light wave range (i.e., R1, G1, B1) and image B may use different red, green and blue light, each in a second respective light wave range (i.e., R2, G2, B2), different from those of (R1, G1, B1). As a non-limiting example, R1 may be red light having a wavelength in a range of 625-640 nm; G1 may be green light having a wavelength in a range of 520-540 nm; B1 may be blue light having a wavelength in a range of 445-460 nm; R2 may be red light having a wavelength in a range of 650-670 nm; G2 may be green light having a wavelength in a range of 550-570 nm; and B2 may be blue light having a wavelength in a range of 465-480 nm. Accordingly, different narrow bands of red, green and blue may be used for presenting multiple different images to be reflected in multiple respective different directions by employing suitable dichroic surface treatments for respective reflectors.

Additionally, in some examples, a first group of the first type of reflectors 806 may be coated to reflect R1 light, while passing other wavelengths of light; a second group of the first type of reflectors 806 may be coated to reflect G1 light, while passing other wavelengths of light; and a third group of the first type of reflectors 806 may be coated to reflect B1 light, while passing other wavelengths of light. Similarly, a first group of the second type of reflectors 808 may be coated to reflect R2 light, while passing other wavelengths of light; a second group of the second type of reflectors 808 may be coated to reflect G2 light, while passing other wavelengths of light; and a third group of the first type of reflectors 808 may be coated to reflect B2 light, while passing other wavelengths of light. The various groups and types of reflectors may be alternated, such as R1, R2, G1, G2, B1, B2, R1, R2, G1, G2, B1, B2, . . . and so forth. Further, the reflective coatings or treatments may substantially reflect the light in the intended range while not reflecting light in the other ranges (i.e., substantially allowing the light in the other ranges to pass through) at least in a manner that is not detectable to a typical unaided human eye.

The projector 706 may alternately project image A using light in the R1, G1, B1 wavelength ranges, and may project image B using light in the R2, G2, B2 wavelength ranges, which do not include lightwaves in the R1, G1, or B1 wavelength ranges. As one example, a color wheel projector may be used to obtain the narrow bands of red, green and blue for projecting each image. As another alternative, laser-based digital light processing may be used to accurately produce different colors of light in desired wavelengths. For instance, six different laser diodes, one each for R1, R2, G1, G2, B1, and B2 may be used in one or two projectors 706. Further, as yet another alternative, rather than alternating frames of image A and image B, the projector 706 may contemporaneously project both image A and image B as combined but spectrally distinct video signals. Other alternatives will also be apparent to those of skill in the art in light of the disclosure herein.

Figure 9A:
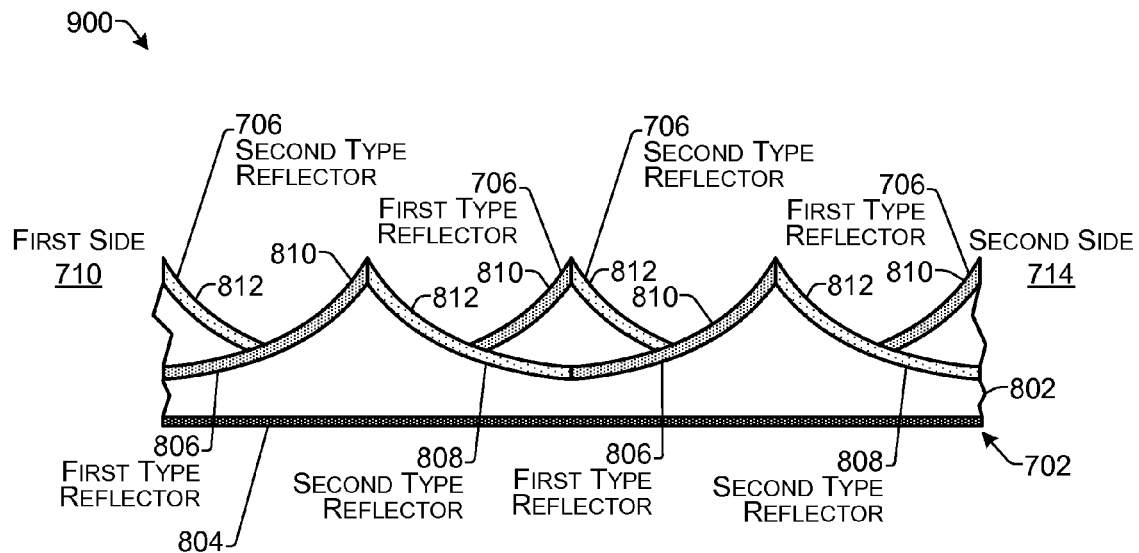
FIGS. 9A and 9B illustrate example reflector configurations of a display surface according to some implementations.
Figure 9B:
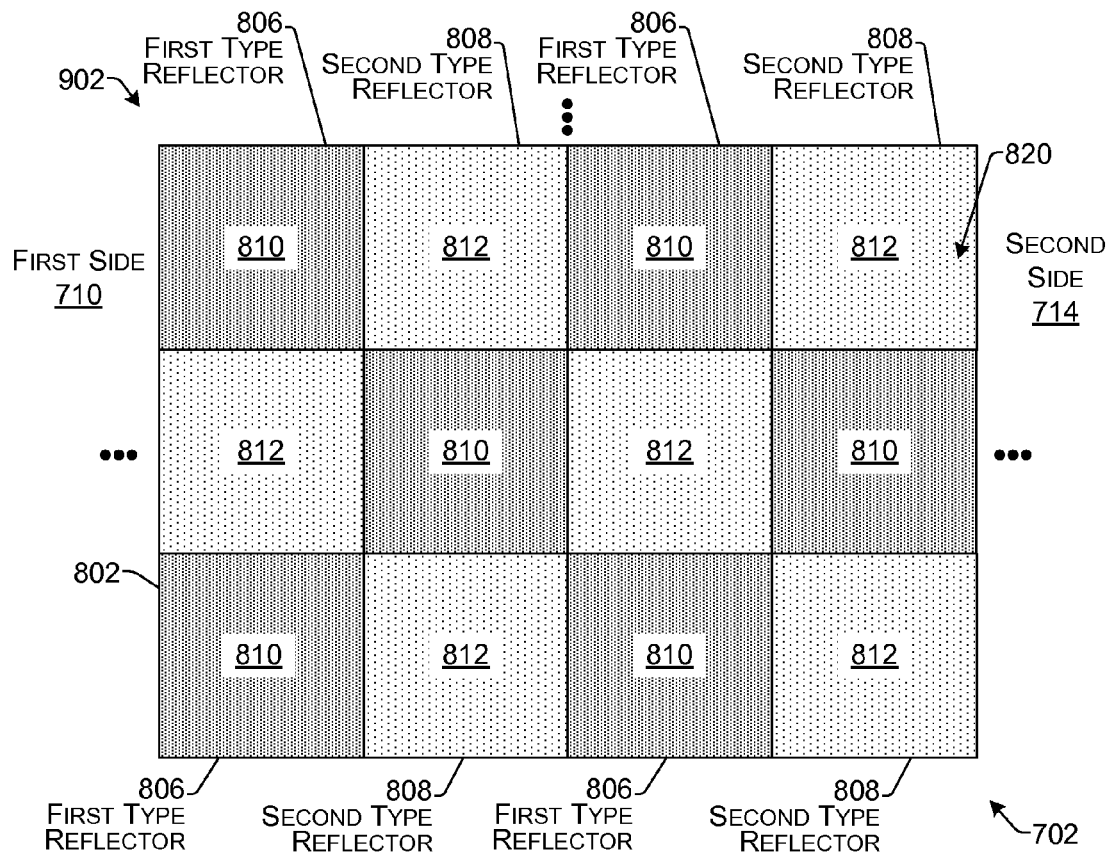

FIGS. 9A and 9B illustrate an example configuration of a surface treatment of the display surface 702 according to some implementations. FIG. 9A illustrates an enlarged cross-sectional view 900 of the display surface 702, similar to that described above with respect to FIG. 8A. In the example of FIG. 9A, the reflectors 806 of the first type and the reflectors 808 of the second type are offset in a checkerboard type of arrangement or pattern, as also illustrated in FIG. 9B. In particular, FIG. 9B illustrates a plan view 902 looking down on the upper surface 820 of an enlarged rectangular portion of the display surface 702. In this example, the reflectors 806, 808 are formed in a pattern that alternates between reflector types both in the longitudinal direction and in the lateral direction (i.e., from the first edge or side 710 to the second edge or side 714). Thus, in this example, the length of each reflector 806, 808 is approximately the same as the width. The reflectors 806, 808 of FIGS. 9A-9B may operate in a manner similar to that discussed above with respect to FIGS. 8A-8B. Additionally, other reflector configurations may alternatively be used in the implementations herein. For example, while the reflectors 806, 808 are shown having a parabolic curve in one direction in the example of FIGS. 9A-9B, in other examples, the reflectors 806, 808 may be curved in two directions to create dish-shaped reflectors 806, 808. Other variations will also be apparent to those of skill in the art in light of the disclosure herein.

Figure 10:
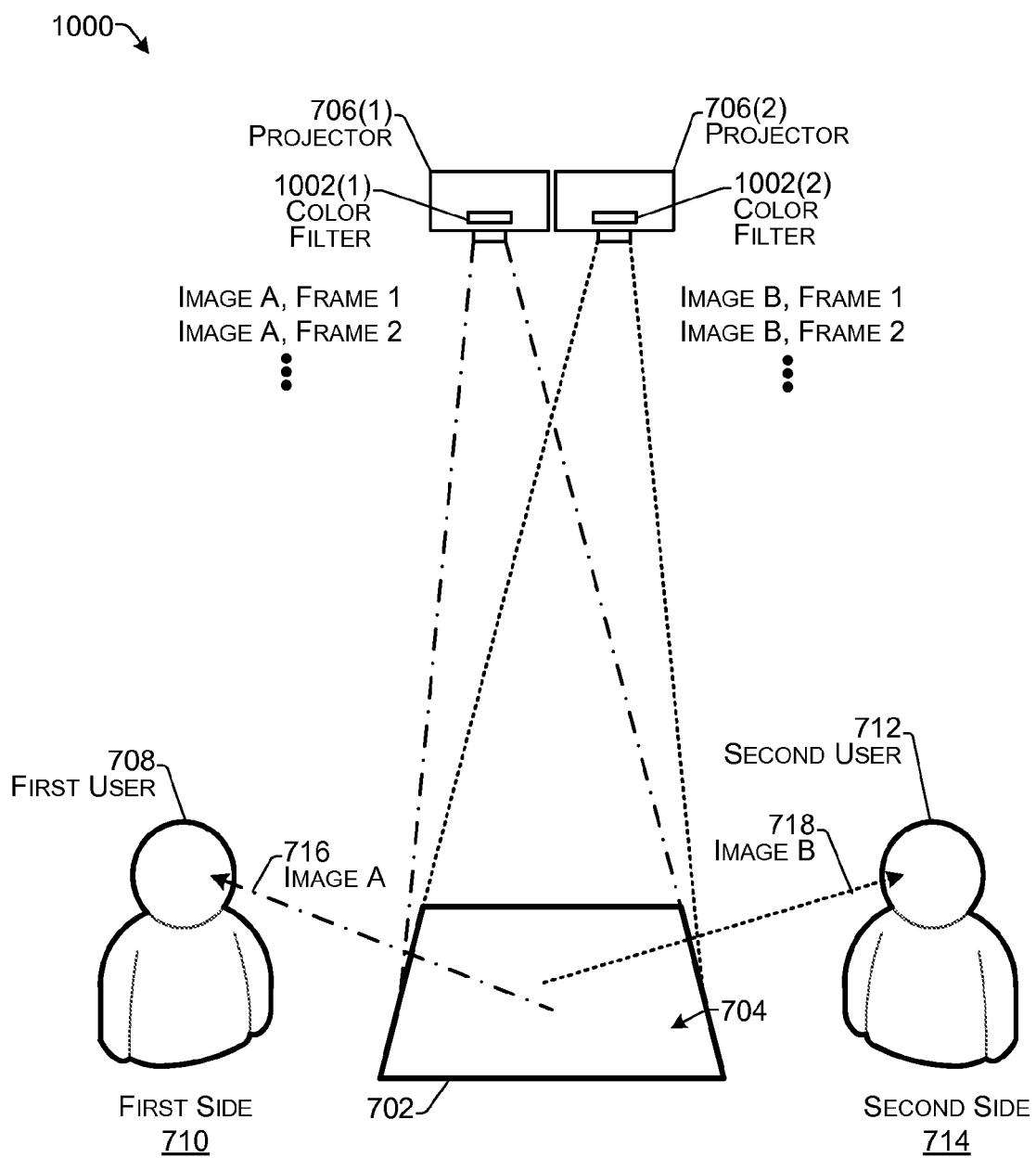
FIG. 10 illustrates an example system that employs two projectors for use with a directional projection display.

FIG. 10 illustrates an example system 1000 including a directional projection display that employs two projectors, such as a first projector 706(1) and a second projector 706(2). For example, in the case that the projectors 706 utilize LED light sources, the generation of narrowband R, G, B colored light may be performed more easily using one or more color filters. In the example of FIG. 10, the first projector 706(1) includes one or more first color filters 1002(1) and the second projector 706(2) includes one or more second color filters 1002(2). For example, the first projector 706(1) having the first color filter 1002(1) may produce the narrow band R1, G1 and B1 light discussed above for image A, while the second projector 706(2) having the second color filter 1002(2) may produce the narrow band R2, G2 and B2 light discussed above for image B. Furthermore, when two projectors 706(1) and 706(2) are employed, image A and image B may be projected onto the display surface 702 contemporaneously, which may provide for a smoother viewing experience and a higher frame rate than in the case in which alternate frames of each image are sequentially displayed.

Figure 11:
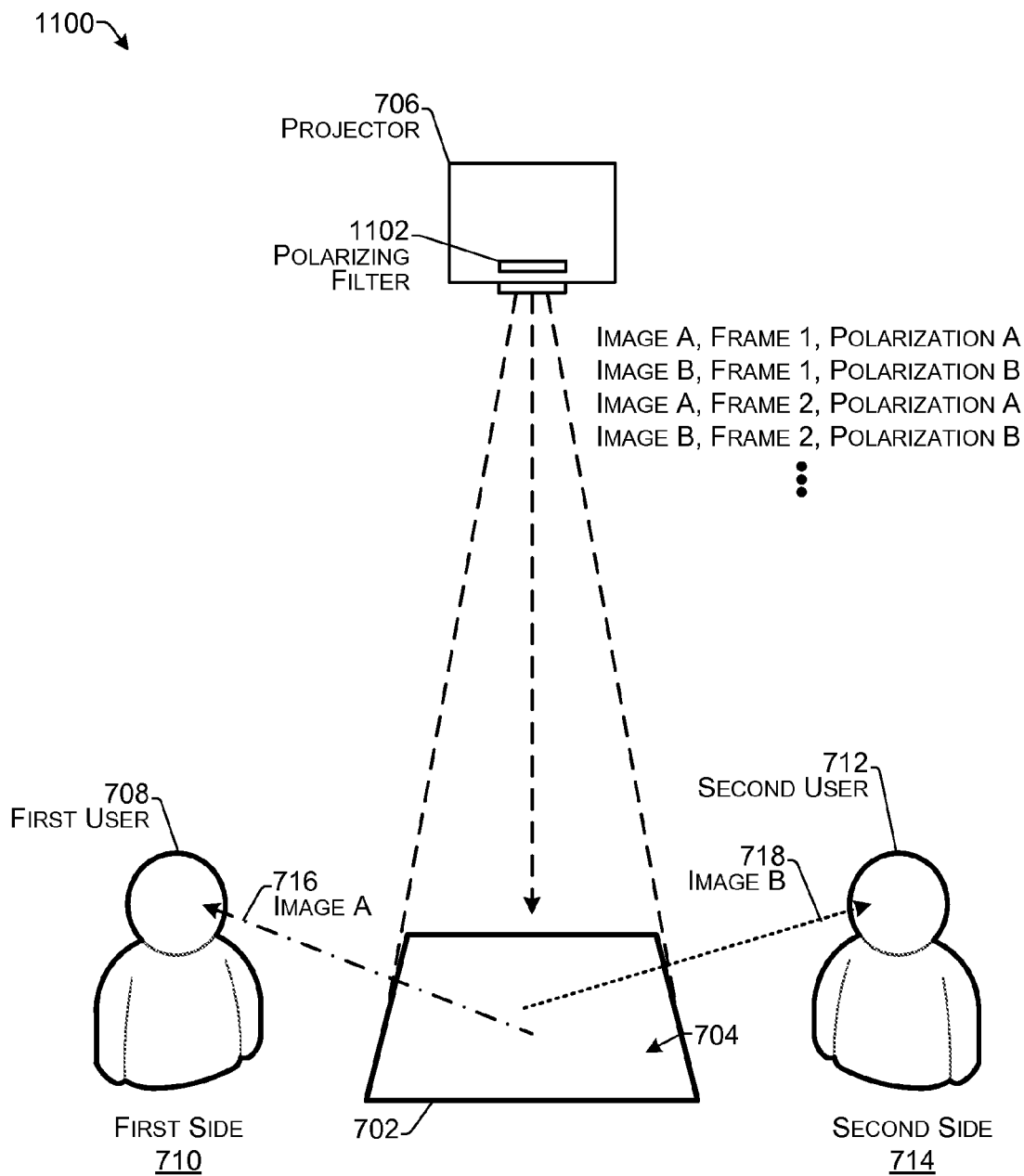
FIG. 11 illustrates an example system for a directional projection display that separates projected images based on polarized light.

FIG. 11 illustrates an example system 1100 including a directional projection display that employs polarization of light to provide directional control to one or more projected images. In the example of FIG. 11, the projector 706 includes a polarizing filter 1102. As one example, the polarizing filter 1102 may be a polarity shifter, such as an LCD plane, that switches the polarity of light passing through it and is able to alternate between a first type of polarization and a second type of polarization. For instance, frame 1 of image A may be polarized with a first type of polarization (polarization A), while frame 1 of image B is polarized with a second type polarization (polarization B). The polarized light is projected toward the display surface 702, which may include a surface treatment to reflect the light from image A toward the first side 710 and the light for image B toward the second side 714. In some examples, a display surface 702 having an arrangement similar to the reflectors 806, 808 discussed above with respect to FIGS. 8A-9B may be employed for reflecting image A toward the first side 710 and image B toward the second side 714. For example, the reflectors 806 may be treated with a coating that reflects a first type of polarized light corresponding to image A, but not the second type of polarized light corresponding to image B, while the reflectors 808 may be treated with a coating that reflects a second type of polarized light corresponding to image B, but not the first type of polarized light corresponding to image A.

FIG. 12A illustrates a reflector arrangement 1200 that may be employed for the display surface 702 when the projected light of image A is polarized differently from that of image B. In this example, image A corresponds to a first type of light and image B corresponds to a second type of light based on the differences in polarization. To illustrate, suppose that the polarizing filter 1102 at the projector 706 polarizes the light of image A to have a left circular polarization (LCP) and polarizes the light of image B to have a right circular polarization (RCP). The display surface 702 may include a quarter wavelength panel 1202 that changes the polarization of the light as it passes through the panel 1202 from circular polarization to linear polarization. Thus, as the light 814 of image A passes through the quarter wavelength panel 1202, the light is polarized in a first direction as indicated by arrow 1204. Similarly, as the light 816 of image B passes through the quarter wavelength panel 1202, the light is polarized in a second direction as indicated by arrow 1206.

Furthermore, a reflective wedge 1208 is located underneath the quarter wavelength panel 1202. A top portion 1210 of the wedge 1208 may be coated with a normal incidence reflective film 1212 that reflects the first type of polarized light of image A back toward the quarter wavelength panel 1202, while allowing the second type of polarized light of image B to pass through the top portion 1210 of the wedge 1208. For example, the second type of polarized light may substantially pass through the reflective film 1212 without being reflected in a manner that is detectable to the unaided human eye. Additionally, a bottom portion 1214 of the wedge 1208 may be treated with a full mirror coating 1216 that reflects the second type of polarized light of image B back through the upper portion 1210 of the wedge 1208 and the quarter wavelength panel 1202. Accordingly, the implementation of FIG. 12A may reflect a first type of polarized light in a first direction and a second type of polarized light in a second direction that is different from the first direction. For example, the different second direction may be at an angle, perpendicular or oblique with respect to the first direction in one or more aspects, and/or generally in a direction opposite to or away from the first direction.

Furthermore, the wedge 1208 may be replicated to produce a plurality of wedge-shaped reflectors 1208 to serve as the display surface 702. For example, a plurality of elongate parallel wedge-shaped reflectors 1208 may be formed on the surface of a substrate, such as an acrylic or glass sheet, in a lenticular fashion in a manner similar to that discussed above with respect to FIGS. 8A-8B. Thus, the display surface 702 may include a large number of parallel wedge-shaped reflectors 1208 that may have a width and height of a size approximately on the order of one or more projected pixels, such as from 100-1000 microns, and length equal to the overall length of the display surface 702.

Figure 12B:
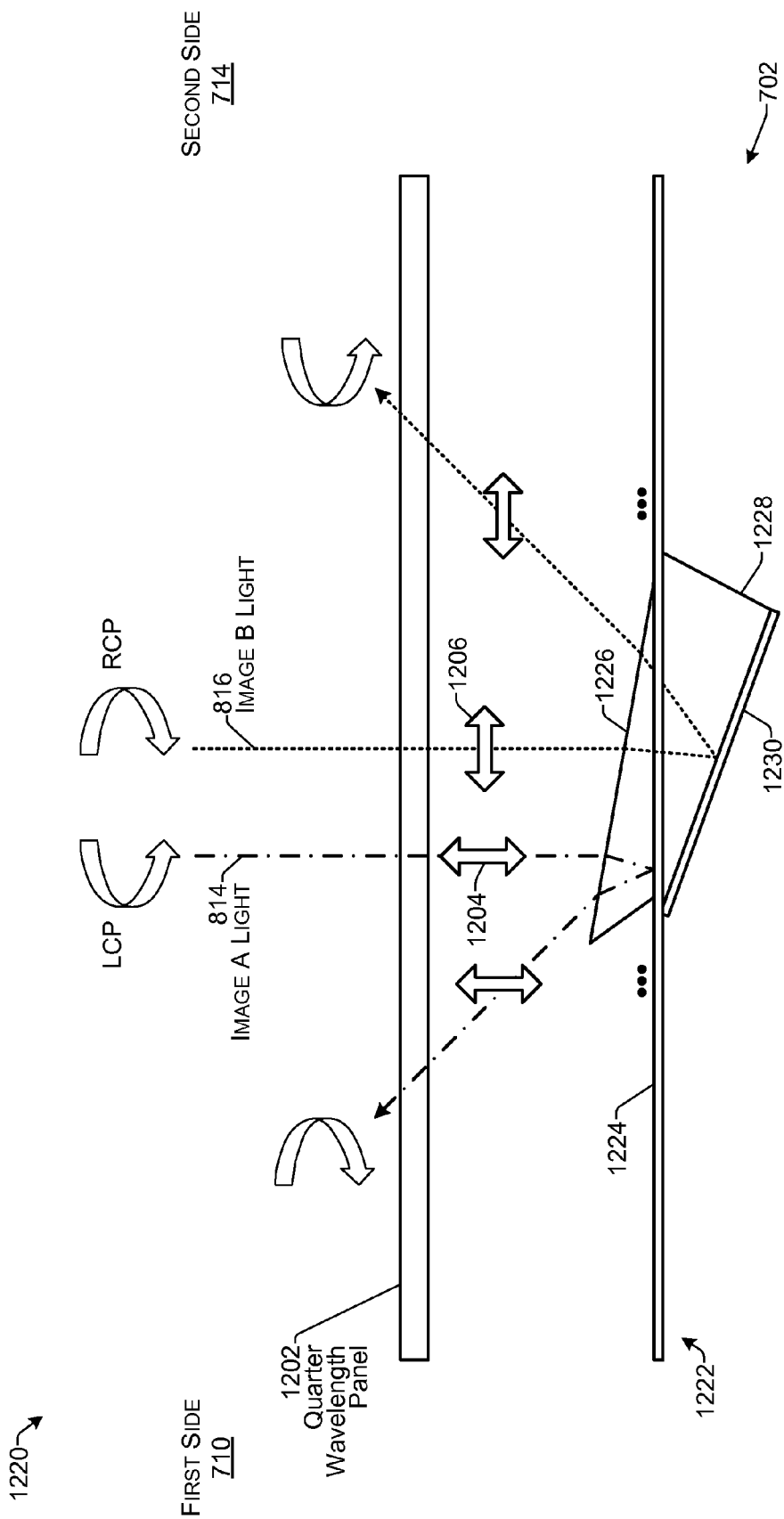

FIG. 12B illustrates an arrangement 1220 that may be employed for the display surface 702 when the projected light of image A is polarized differently from that of image B. In this example, separation of the two different types of light occurs at a planar location or planar surface 1222. For example, the planar surface 1222 may be coated or otherwise treated to reflect the first type of light, while allowing passage of the second type of light. As one example, the planar surface 1222 may be coated with a normal incidence reflective film 1224 that reflects the first type of polarized light 814 of image A back toward the quarter wavelength panel 1202, while allowing the second type of polarized light 816 of image B to pass through planar surface 1222. For example, the second type of polarized light may substantially pass through the reflective film 1224 without being reflected in a manner that is detectable to the unaided human eye. Further, an upper wedge 1226 may direct the reflected first type of light 814 toward the first side or edge of the display surface 702. A lower wedge 1228 may be treated with a full mirror coating 1230 that reflects the second type of polarized light 816 of image B back through the planar surface 1224, the upper wedge 1226 and the quarter wavelength panel 1202 toward the second side 714. Accordingly, the implementation of FIG. 12B may reflect a first type of polarized light in a first direction and a second type of polarized light in a second direction that is different from the first direction. The wedges 1226 and 1228 may be formed of acrylic, glass or other suitable waveguide material, and may be replicated as a plurality of reflectors along the planar surface 1222. In addition, while several examples of display surfaces 702 suitable for reflecting different types of polarized light in respective different directions have been described herein, other examples will be apparent to those of skill in the art having the benefit of the disclosure herein.

Figure 13:
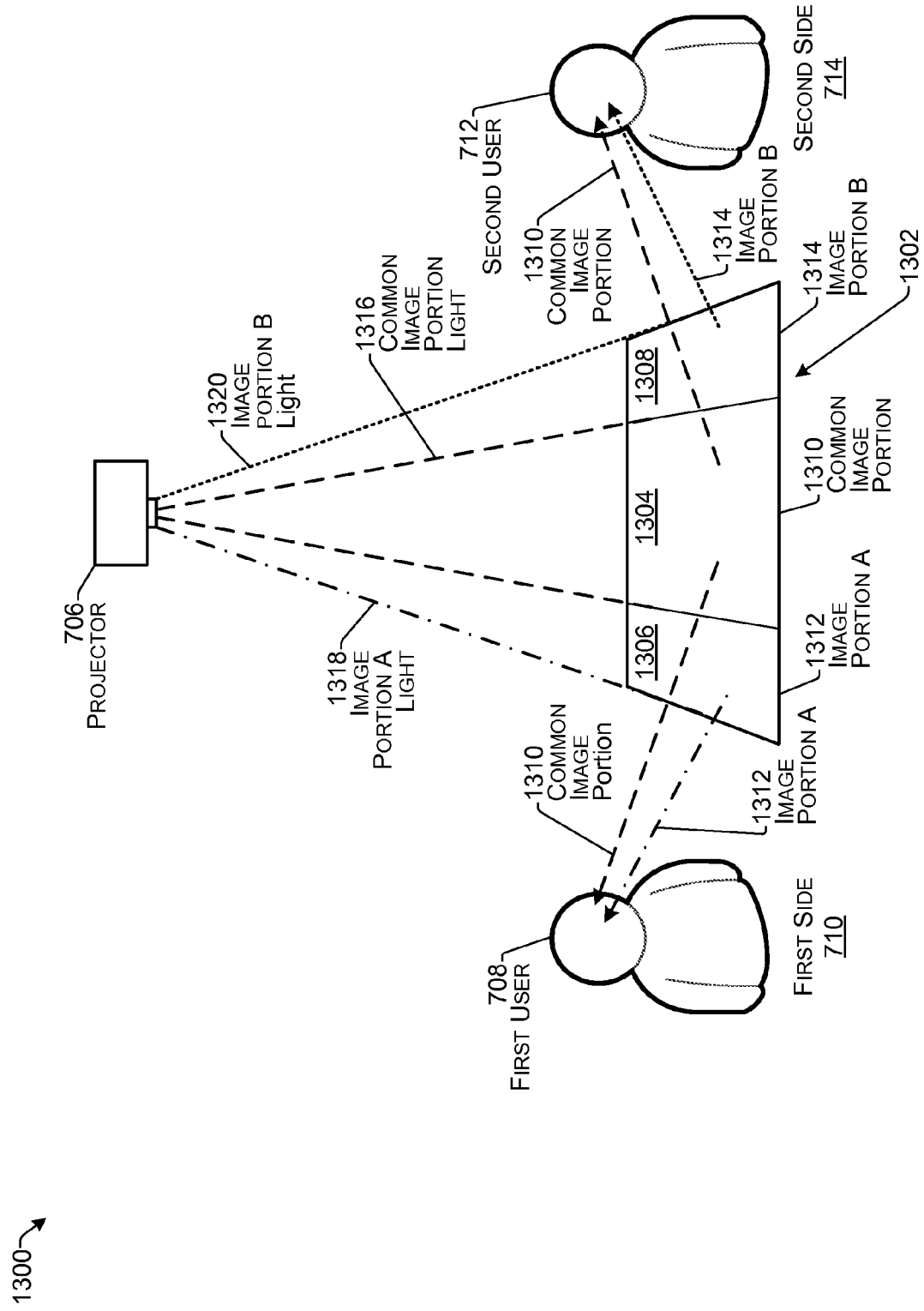
FIG. 13 illustrates an example system for a directional projection display according to some implementations.

FIG. 13 illustrates an example system 1300 for a directional projection display that employs a divided image and a display surface 1302 having different parts with different reflective properties. In the example of FIG. 13, the display surface 1302 is divided into three parts or areas, i.e., a center area 1304, a first side area 1306 and a second side area 1308. The center area 1304 may be configured to reflect a common image portion 1310 to both the left side 710 and the right side 714. The first side area 1306 may be configured to reflect an image portion A 1312 exclusively toward the first side 710 such that the image portion A 1312 is not visible to the user 712 on the second side 714. Similarly, the second side area 1308 may be configured to reflect the image portion B 1314 exclusively toward the second side 714 so that the image portion B 1314 is not visible to the first user 708 on the first side 710.

In this example, the image projected by the projector 706 may be divided into three portions when the image is initially created or generated. Thus, the projected image includes a common portion 1310 that is intended to be viewed by both users 708, 712; an image portion A that is intended to be viewed only by the first user 708 on the first side 710 and not by the second user 712; and an image portion B that is intended to be viewed only by the second user 712 on the second side 714, and not by the first user 708 on the first side. To achieve this effect, the light of each of the three image portions generally aligns with the three areas of the display surface 1302. Accordingly, the light 1316 for the common image portion 1310 aligns with the center area 1304, the light 1318 for image portion A 1312 aligns with the first side area 1306, and the light 1320 for the image portion B 1314 aligns with the second side area 1308.

Figure 14A:
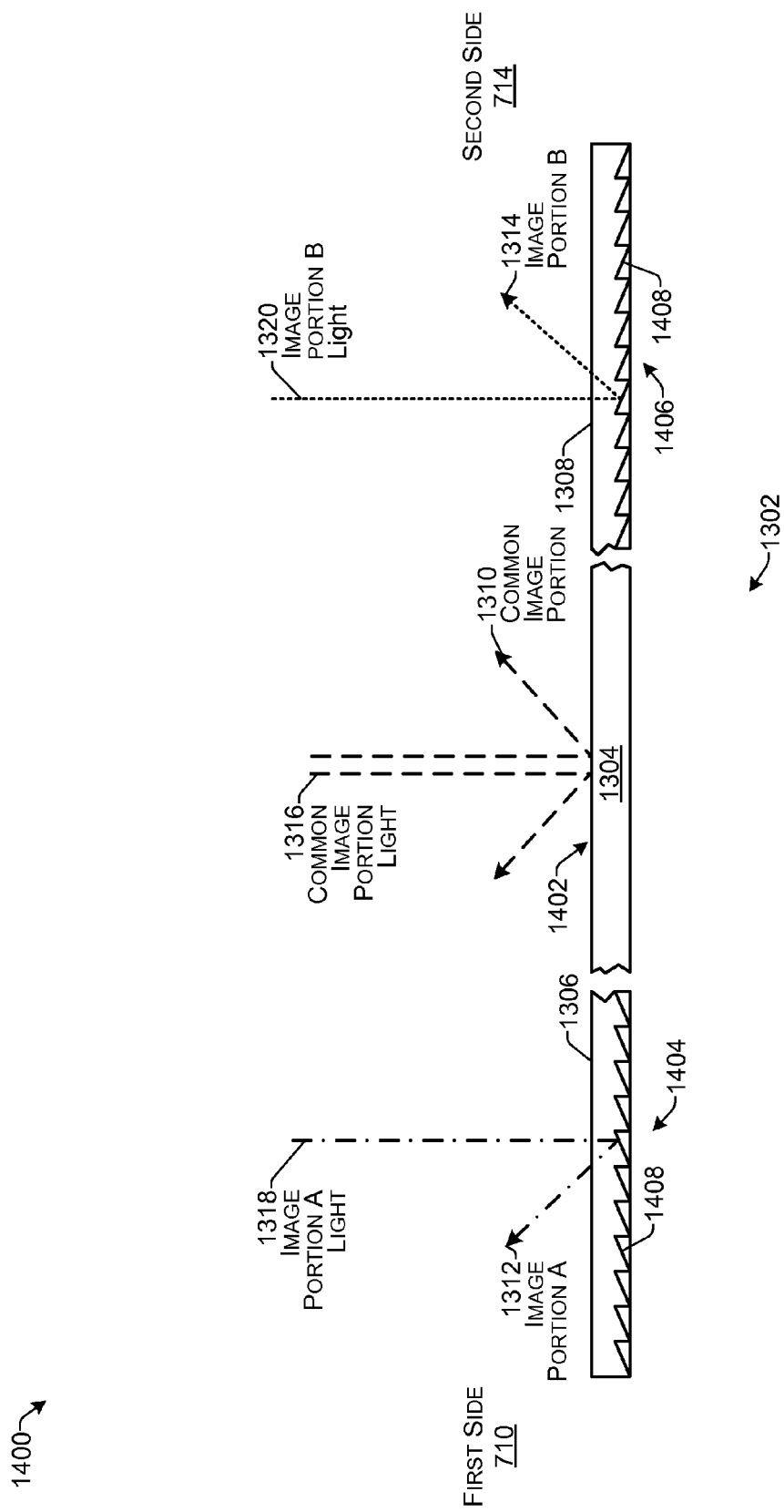
FIGS. 14A and 14B illustrate example configurations of display surfaces for use with a divided image.

FIG. 14A illustrates an example enlarged cross-sectional view 1400 of the display surface 1302 according to some implementations. In this example, the display surface 1302 includes a reflective surface 1402 on the center area 1304 that is configured to reflect light toward both the first side 710 and the second side 714. The reflective surface 1402 may be any suitable display surface, projection screen surface, projection display medium, or the like. Accordingly, the light 1316 corresponding to the common image portion that is projected onto the reflective surface 1402 is reflected toward both sides 710, 714.

In the example of FIG. 14A, the display surface 1302 further includes a first plurality of reflectors 1404 located at the first side area 1306. The first plurality of reflectors may be wedge shaped and configured to reflect the light 1318 of image portion A exclusively toward the first side 710. Thus, the image portion A 1312 is visible to the first user on the first side 710, but not visible to the second user on the second side 714.

Similarly, the display surface 1302 further includes a second plurality of reflectors 1406 located at the second side area 1308. The second plurality of reflectors 1406 may be wedge shaped and configured to reflect the light 1320 of image portion B exclusively toward the second side 714. Thus, the image portion B 1314 is visible to the second user on the second side 714, but not visible to the first user on the first side 710. In some examples, a diffuser or diffusing layer 1408 may be located on some or all of the reflectors 1404 and 1406, or may be otherwise employed with the reflectors 1404 and 1406 to scatter and diffuse the reflected images.

In addition, while the display surface 1302 includes three areas 1304, 1306 and 1308 in the illustrated example, in other examples, the center area 1304 may be eliminated and the display surface may just include the first side area 1306 and the second side area 1308, such as each area 1306, 1308 occupying distinct halves of the display surface 1302. Alternatively, the display surface 1302 may include more than three distinct areas, such as five distinct areas, namely the areas 1304, 1306 and 1308, and two additional areas that may reflect image portions toward additional users to the left and right sides of the first user and the second user. As still another alternative, any of the display surfaces 702 described above with respect to FIGS. 7-12 may include a center area 1304 that may be configured to reflect a common image portion to at least the first side 710 and the second side 714. For example, a game board, commonly viewable playing cards, or various other images may be displayed as the common image in some implementations.

Figure 14B:
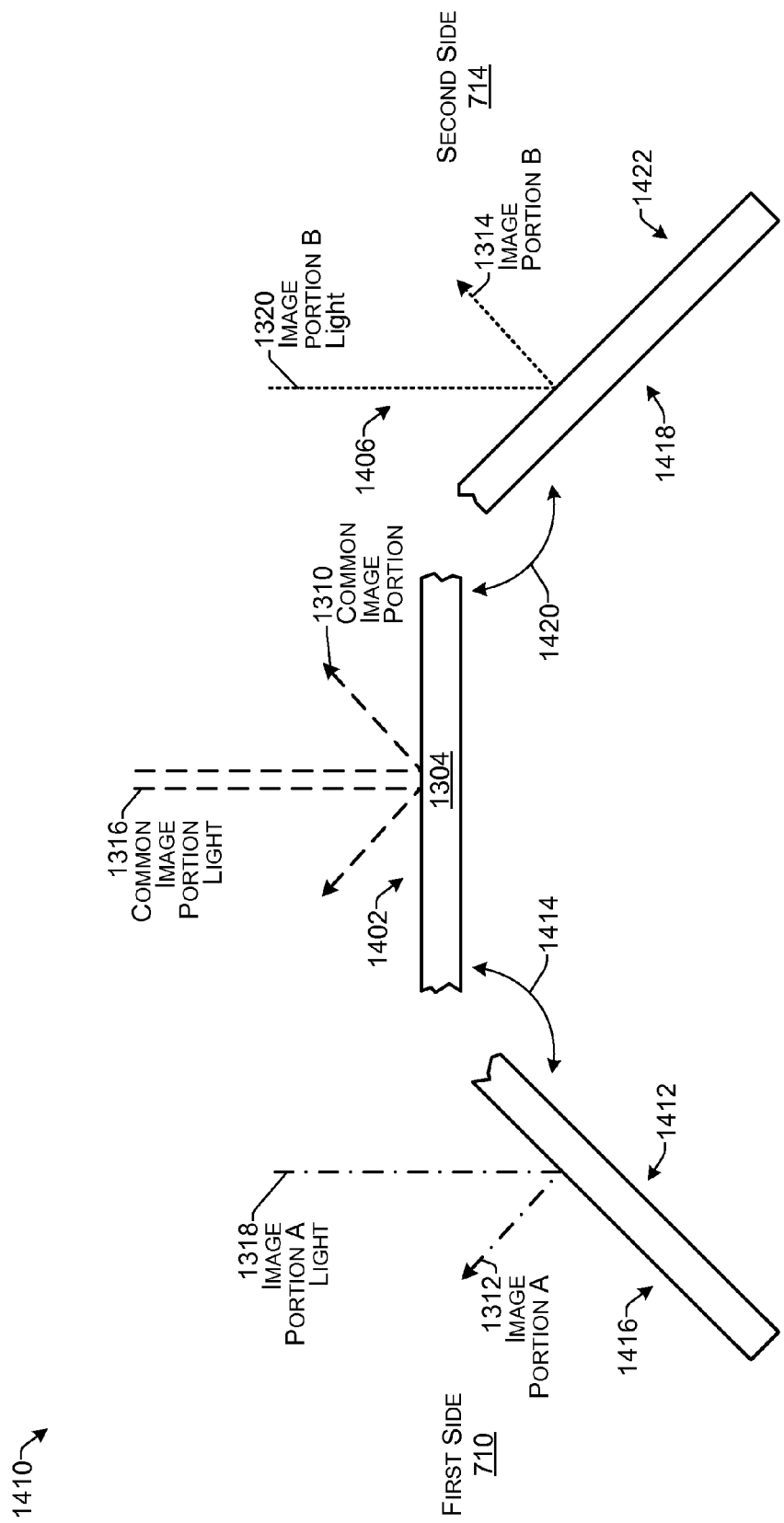

FIG. 14B illustrates an example of a nonplanar display surface 1410 that includes portions of the display surface positioned at an angle relative to other portions of the display surface 1410. In this example, the center area 1304 may be flat or in a horizontal plane. A first side area 1412 may be positioned at an angle 1414 relative to the plane of the center area 1304. For example, the first side area 1412 may be at a 30 degree angle, a 45 degree angle, or the like, so that light of image portion A 1318 that impinges on a surface 1416 is reflected toward the first side 710 and not toward the second side 714. For example, the surface 1416 may be a reflective surface similar to the surface 1402 described above. Similarly, a second side area 1418 of the display surface 1410 may also be positioned at an angle 1420 relative to the center area 1304 similar and opposite to the angle 1414. Accordingly, the second side area 1418 may be at a 30° angle, 45° angle, or the like, so that light of image portion B 1320 that impinges on a surface 1422 of the second side area 1418 is reflected toward the second side 714 and not toward the first side 710. For example, the surface 1422 may be a reflective surface similar to the surface 1402 described above. Thus, in some examples, the display surface 1410 may form a trapezoidal configuration when viewed from the side, as illustrated in the example of FIG. 14B. Various keystone correction techniques may be applied to the image portions 1318 and 1320 that are projected onto the angled surfaces 1416 and 1422 respectively. Furthermore, in some examples, the center area 1304 may be eliminated and the first side area 1412 and the second side area 1418 may form an A-frame or triangular configuration when viewed from the side. Additionally, in still other examples, the display surface 1410 may be in the form of a pyramid or a truncated pyramid having three or four sides, each reflecting light toward a different user. Other variations will also be apparent to those of skill in the art having the benefit of the disclosure herein.

FIG. 15 shows an illustrative process 1500 of displaying one or more images on a projection display with directional control according to some implementations. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks are executed in each implementation. It is understood that the following processes may be implemented with other architectures as well. In some examples, the process 1500 may be executed by the presentation module 154 of the computing device 120 discussed above with respect to FIG. 1.

At 1502, the presentation module may cause projection of first light corresponding to a first image onto a display surface that includes a first plurality of reflectors configured to reflect the first light in a first direction, but not reflect second light corresponding to a second image, and a second plurality of reflectors to reflect the second light in a second direction, but not reflect the first light. For example, one or more users may be using an application that employs directional control over at least a portion of an image displayed on a projection display surface. The display module may determine a proper orientation for projecting the first image and the second image onto the display, such as based on a location of each of the users with respect to the display surface. In some examples, the first light is within a first wavelength range and the second light is within a second wavelength range that is different from the first wavelength range. In other examples, the first light may have a first polarization and the second light may have a second polarization that is different from the first polarization direction.

At 1504, the presentation module 154 may cause projection of the second light corresponding to the second image onto the display surface, wherein the first image is reflected in the first direction and the second image is reflected in the second direction. For example, if two users are using the display surface, the first image may be viewable by the first user, but not by the second user, and the second image may be viewable by the second user, but not the first user.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
at least one projector to project first light corresponding to a first image and second light corresponding to a second image, wherein the first light is within a first wavelength range and the second light is within a second wavelength range that is different from the first wavelength range; and
a display surface to receive the first light and the second light from the at least one projector, the display surface including:
a first plurality of reflectors positioned to reflect the first light received from the at least one projector toward a first side of the display surface, the first plurality of reflectors including a first treatment configured to reflect the first light and not reflect the second light; and
a second plurality of reflectors positioned to reflect the second light received from the at least one projector toward a second side of the display surface, different from the first side of the display surface, the second plurality of reflectors including a second treatment configured to reflect the second light and not reflect the first light.

2. The system as recited in claim 1, wherein:
the at least one projector includes multiple projectors;
a first projector of the multiple projectors projects the first light corresponding to the first image; and
a second projector of the multiple projectors projects the second light corresponding to the second image.

3. The system as recited in claim 1, wherein the first light includes red, green and blue light in respective wavelength ranges that do not overlap with respective wavelength ranges of red, green and blue light included in the second light.

4. A display surface comprising:
a first plurality of reflectors oriented to reflect first light in a first direction; and
a second plurality of reflectors oriented to reflect second light in a second direction that is different from the first direction, wherein:
based on at least one of a difference in wavelength range or a difference in polarization between the first light and the second light, the first plurality of reflectors do not substantially reflect the second light and the second plurality of reflectors do not substantially reflect the first light.

5. The display surface as recited in claim 4, wherein:
the first light includes visible light in a first wavelength range;
the second light includes visible light in a second wavelength range that does not overlap the first wavelength range;
the first plurality of reflectors include a first type of dichroic treatment to reflect the first light; and
the second plurality of reflectors include a second type of dichroic treatment to reflect the second light.

6. The display surface as recited in claim 4, wherein:
the first light has a first polarization and the second light has a second polarization that is different from the first polarization; and
the first plurality of reflectors include a reflective treatment to reflect the first light having the first polarization, while allowing the second light having the second polarization to pass through the reflective treatment.

7. The display surface as recited in claim 6, wherein:
the second plurality of reflectors are located under the first plurality of reflectors; and
the second plurality of reflectors include a reflective treatment to reflect the second light having the second polarization.

8. The display surface as recited in claim 4, further comprising:
a substrate having an upper surface, wherein the first plurality of reflectors and the second plurality of reflectors are on or formed in the upper surface of the substrate; and
a light absorber positioned behind the upper surface of the substrate to absorb light that passes through the first plurality of reflectors or the second plurality of reflectors.

9. The display surface as recited in claim 4, wherein at least the first plurality of reflectors or the second plurality of reflectors have reflective surfaces that are at least one of:
at least partially paraboloidal; or
at least partially ellipsoidal.

10. The display surface as recited in claim 4, further comprising a substrate of an optically transparent material, wherein:
the first plurality of reflectors and the second plurality of reflectors are formed on a surface of the substrate; and
the first plurality of reflectors are alternated with the second plurality of reflectors in a pattern formed at least one of laterally or longitudinally across the surface.

11. The display surface as recited in claim 10, wherein the first plurality of reflectors are alternated with the second plurality of reflectors both laterally and longitudinally across the surface in a checkerboard pattern.

12. The display surface as recited in claim 4, wherein the first light includes red, green and blue light in respective wavelength ranges that do not overlap with respective wavelength ranges of red, green and blue light included in the second light.

13. A device comprising:
a substrate having a surface, a first side and a second side;
a first plurality of reflectors on the surface and positioned to reflect light in a first direction toward the first side, but not toward the second side; and
a second plurality of reflectors on the surface and positioned to reflect light in a second direction toward the second side, but not toward the first side, wherein a first portion of an image projected onto the substrate is reflected substantially toward the first side and a second portion of the image is reflected substantially toward the second side.

14. The device as recited in claim 13, further comprising a reflective surface configured to reflect a common portion of the image toward both the first side and the second side.

15. The device as recited in claim 13, wherein the first plurality of reflectors are located on a first area of the substrate and the second plurality of reflectors are located on a second area of the substrate distinct from the first area of the substrate.

16. The device as recited in claim 13, further comprising a reflective surface configured to reflect a common portion of the image toward both the first side and the second side, wherein:
the first plurality of reflectors are located at a first area of the substrate;
the second plurality of reflectors are located at a second area of the substrate distinct from the first area of the substrate; and
the reflective surface is located at a third area of the substrate distinct from the first area and the second area.

17. The device as recited in claim 13, wherein:
the device comprises a display surface that includes the substrate;
the first side of the substrate corresponds to a first side edge of the display surface; and
the second side of the substrate corresponds to a second side edge of the display surface that is opposite to the first side edge of the display surface.

18. A method comprising:
projecting first light corresponding to a first image onto a display surface that includes a first plurality of reflectors configured to reflect the first light in a first direction, but not reflect second light corresponding to a second image, and a second plurality of reflectors configured to reflect the second light in a second direction, but not reflect the first light; and
projecting the second light corresponding to the second image onto the display surface, wherein the first image is reflected in the first direction and the second image is reflected in the second direction.

19. The method as recited in claim 18, wherein the projecting the first light and the projecting the second light is performed sequentially by projecting a frame corresponding to the first image followed by projecting a frame corresponding to the second image.

20. The method as recited in claim 18, wherein the projecting the first light and the projecting the second light includes projecting the first light with red, green and blue light in respective wavelength ranges that do not overlap with respective wavelength ranges of red, green and blue light projected in the second light.

21. The method as recited in claim 18, further comprising:
polarizing the first light to have a first type of polarization; and
polarizing the second light to have a second type of polarization, different from the first type of polarization.

22. The method as recited in claim 18, further comprising:
identifying a location of a first user and a location of a second user relative to the display surface; and
projecting the first light and the second light onto the display surface based at least in part on the identified locations of the first user and the second user.

\* \* \* \* \*